United States Patent [19]

Fujii et al.

[11] Patent Number: 5,513,341

[45] Date of Patent: Apr. 30, 1996

[54] SUPERVISORY SYSTEM FOR NETWORK EQUIPMENTS

[75] Inventors: Yasuo Fujii; Masami Yamaguchi, both of Kawasaki, Japan

[73] Assignee: Fujitsu Limited, Kanagawa, Japan

[21] Appl. No.: 29,804

[22] Filed: Mar. 11, 1993

[30] Foreign Application Priority Data

Mar. 12, 1992 [JP] Japan ..................................... 4-053857

[51] Int. Cl.$^6$ ...................................................... G06F 11/20
[52] U.S. Cl. .................. 395/575; 364/268.3; 364/268.6; 364/268.9; 364/269.2; 364/285.3; 364/DIG. 1; 371/20.1
[58] Field of Search ..................... 395/650, 575, 395/700; 364/944, 944.2, 944.61, DIG. 2; 371/9.1, 11.3

[56] References Cited

U.S. PATENT DOCUMENTS

| | | | |
|---|---|---|---|
| 5,121,486 | 6/1992 | Kurihara et al. | 395/325 |
| 5,157,663 | 10/1992 | Major et al. | 395/575 |
| 5,247,664 | 9/1993 | Thompson et al. | 395/575 |
| 5,343,477 | 8/1994 | Yamada | 395/575 |
| 5,363,503 | 11/1994 | Gleeson | 395/575 |

FOREIGN PATENT DOCUMENTS 3-158023  7/1991  Japan .
4-111541  4/1992  Japan .

*Primary Examiner*—Kevin A. Kriess
*Assistant Examiner*—John Q. Chavis

[57] ABSTRACT

A supervisory system for supervising equipments communicating with each other via communication lines in a network, the supervisory system includes a plurality of supervisory devices, each of which devices is used for supervising a plurality of equipments in the network; and a controller for controlling the plurality of supervisory devices so that one of the plurality of supervisory devices performs a supervising operation for the plurality of equipments in the network. The controller includes a determination unit for determining whether or not each of the plurality of supervisory devices is operating normally; an instruction unit for supplying either a first instruction or a second instruction to each of the plurality of supervisory devices based on a determination result obtained by the determination unit, the first instruction indicating that a supervisory device to which the first instruction is supplied is to be active in the supervisory operation, the second instruction indicating that a supervisory device to which the second instruction is supplied is to be inactive in the supervisory operation; and a selecting unit for selecting from the plurality of supervisory devices a supervisory device to which the first instruction is supplied, so that the supervisory device selected by the selecting unit supervises the plurality of equipments in the network in accordance with the first instruction.

12 Claims, 18 Drawing Sheets

TO UPPER HIERARCHY & LOWER HIERARCHY

TO UPPER HIERARCHY & LOWER HIERARCHY

SUPERVISORY SYSTEM FOR NETWORK EQUIPMENTS

BACKGROUND OF THE INVENTION (1) Field of the Invention

The present invention generally relates to a supervisory system for network equipments, and more particularly to a supervisory system for gathering status information via lines from a plurality of network equipments communicated with each other in a network so as to survey the network equipments, the status information indicating status of each network equipment.

Recently, a supervisory system for hierarchically surveying a plurality of network equipments dispersed in a network has been proposed. Due to this type of the supervisory system, maintenance works for the network can be effectively performed and the reliability of communication between network equipments in the network can be improved.

(2) Description of the Related Art

FIG.1 shows a supervisory system for hierarchically surveying a plurality of network equipments. Referring to FIG. 1, a plurality of network equipments 10 are connected with each other by a line 15 so that the communications between the network equipments 10 are performed via the line 15. Each of subordinate supervisory devices (SSV) 20(1) and 20(2) surveys connected to a plurality of network equipments 10, and a middle supervisory device 30 supervises the subordinate supervisory devices (MSV) 20(1) and 20(2). Furthermore, the middle supervisory device 30 is supervised by an outranking system (OSS). In this system, each of the subordinate supervisory devices (SSV) 20(1) and 20(2) are centrally gathering performance data indicating changing of the status (e.g. a bit error rate) of the network equipments. The performance data is further transmitted from each of the subordinate supervisory devices (SSV) 20(1) and 20(2) to the middle supervisory device (MSV) 30. Then, the performance data is finally supplied from the middle supervisory device (MSV) 30 to the outranking system (OSS).

The above supervisory system can be extended to a hierarchical supervisory system as shown in FIG. 2. Referring to FIG. 2, the hierarchical supervisory system has four hierarchies. The first hierarchy is provided with primary supervisory devices (P-SV) connected to network equipments (NE). The primary supervisory devices (P-SV) are set up in remote terminals. The second hierarchy is provided with regional supervisory devices (R-SV) connected to the primary supervisory devices (P-SV). The regional supervisory devices (R-SV) are set up in regions each of which regions includes one or a plurality of the remote terminals. The third hierarchy is provided with extensive supervisory devices (X-SV) connected to the regional supervisory devices (R-SV). The extensive supervisory devices (X-SV) are set up in zones each of which zones is formed of one or a plurality of regions. The fourth hierarchy is provided with a center supervisory device (C-SV) connected to the extensive supervisory devices (X-SV). The center supervisory device (C-SV) gathers the performance data from the network equipments (NE) via the primary supervisory devices (P-SV), the regional supervisory devices (R-SV) and the extensive supervisory devices (X-SV). The primary supervisory devices (P-SV) and the regional supervisory devices (R-SV) respectively correspond, for example, to the subordinate supervisory devices (SSV) and the middle supervisory devices (MSV) shown in FIG. 1. A system formed of the extensive supervisory devices (X-SV) and the center supervisory device (C-SV) corresponds, for example, to the outranking system (OSS). Each unit formed of the extensive supervisory device (X-SV) and the regional supervisory devices (R-SV) under the extensive supervisory device (X-SV) may correspond to the middle supervisory device (MSV) shown in FIG. 1. In this case, the center supervisory device C-SV corresponds to the outranking system (OSS).

In the above system for hierarchically surveying a plurality of network equipments, as shown in FIG. 1, if a supervisory device (the SSV or the MSV) in any hierarchy is troubled, the performance data of the network equipments under the troubled supervisory device cannot be transmitted to the outranking system (OSS). It is thus desired that the outranking system (OSS) estimates trouble points in the network and estimates causes of the troubles based on the performance data gathered from the network equipments. In this case, a matter is a problem in which when a supervisory device in any hierarchy is troubled, the performance data from any part of the network equipments under the problem supervisory device cannot be gathered by the outranking system (OSS).

SUMMARY OF THE INVENTION

Accordingly, a general object of the present invention is to provide a novel and useful supervisory system for network equipments in which the disadvantages of the aforementioned prior art are eliminated.

A more specific object of the present invention is to provide a supervisory system for network equipments in which system even if one supervisory device experiences problem in any hierarchy, information from the network equipments under the troubled supervisory device can be supplied to an outranking system.

The above objects of the present invention are achieved by a supervisory system for supervising equipments communicated with each other via communication lines in a network, the supervisory system comprising: a plurality of supervisory devices, each of which devices is used for supervising a plurality of equipments in the network; and control means for controlling the plurality of supervisory devices so that one of the plurality of supervisory devices performs a supervising operation for the plurality of equipments in the network, wherein the control means comprises: determination means for determining whether or not each of the plurality of supervisory devices is normal; instruction means for supplying either a first instruction or a second instruction to each of the plurality of supervisory devices based on a determination result obtained by the determination means, the first instruction indicating that a supervisory device to which the first instruction is supplied is to be active in the supervisory operation, the second instruction indicating that a supervisory device to which the second instruction is supplied is to be inactive in the supervisory operation; and selecting means for selecting a supervisory device, to which the first instruction is supplied, from the plurality of supervisory devices, so that the supervisory device selected by the selecting means supervises the plurality of equipments in the network in accordance with the first instruction.

According to the present invention, when a supervisory device performing the supervisory operation for the equipments in the network is troubled, the surpervisory device is changed to another supervisory device. Thus, even if one supervisory device is troubled in any hierarchy, information from the equipments under the troubled supervisory device can be supplied to an outranking system via the other supervisory device.

Additional objects, features and advantages of the present invention will become apparent from the following detailed description when read in conjunction with the accompanying drawings.

DESCRIPTION OF THE PREFERRED EMBODIMENTS

A description will now be given, with reference to FIGS. 3 and 4, of the principle of a first embodiment of the present invention.

Figure 1:
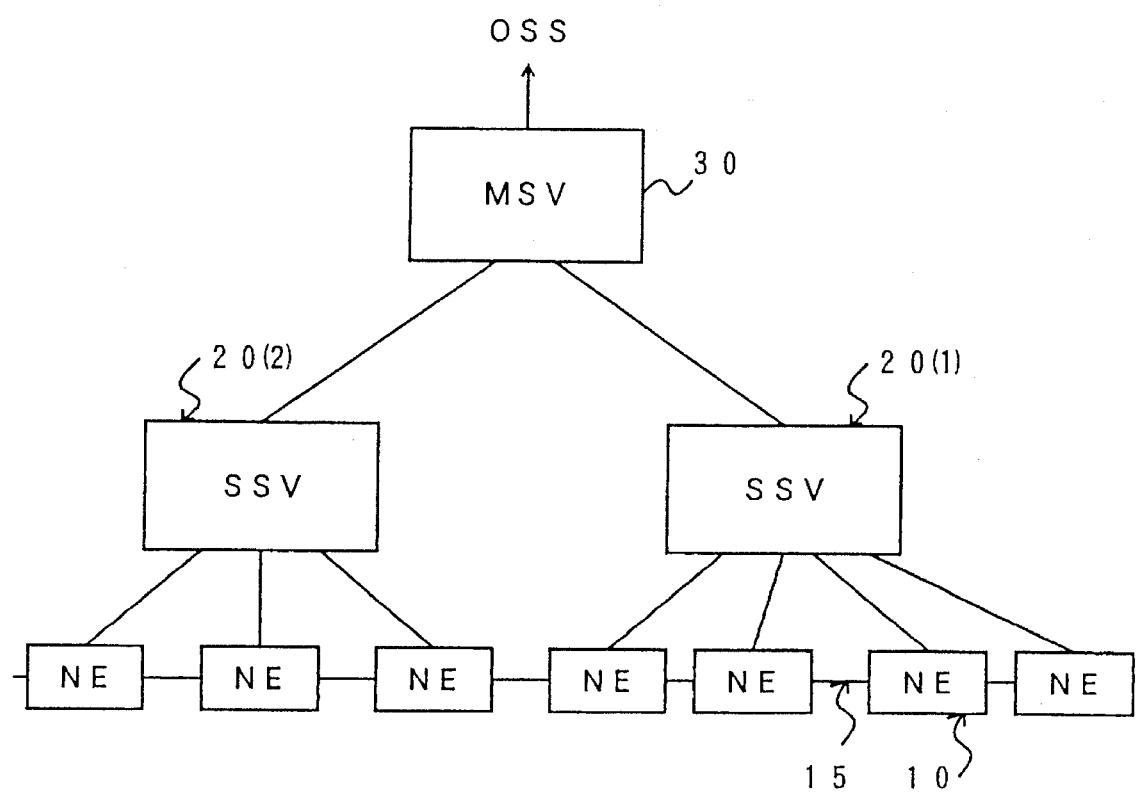
FIG. 1 is a block diagram illustrating a conventional supervisory system for hierarchically surveying a plurality of network equipments dispersed in a network.
Figure 2:
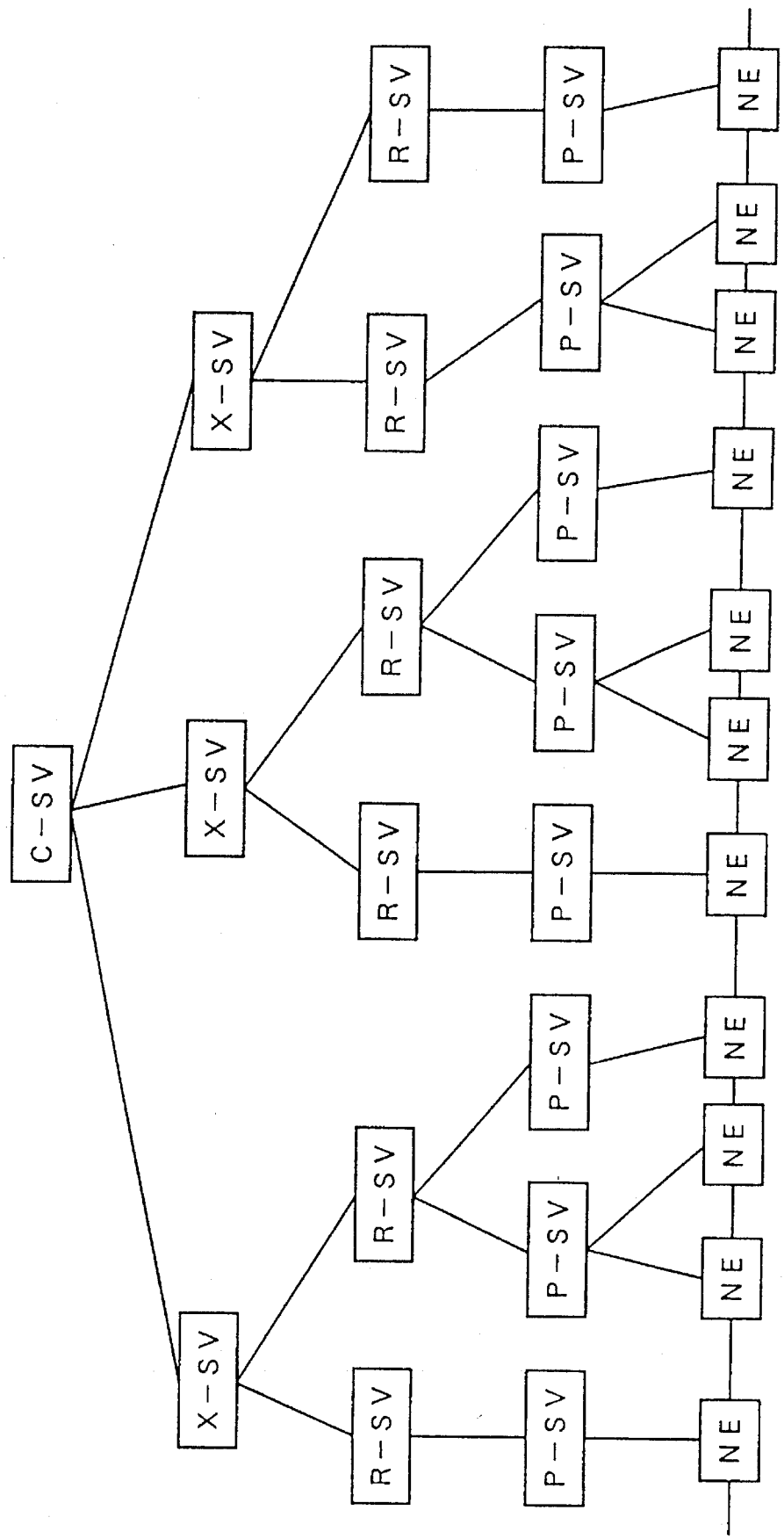
FIG. 2 is a block diagram illustrating a conventional supervisory system to which the supervisory system shown in FIG.1 is extended.

A supervisory system according to the first embodiment hierarchically surveys a plurality of network equipments as shown in FIG. 1 or FIG. 2. In each hierarchy of the supervisory system, each supervisory device (SSV and MSV shown in FIG. 1 or P-SV, R-SV and X-SV shown in FIG. 2) is duplicated as shown in FIG. 3. Referring to FIG. 3, a first supervisory device SV#0 and a second supervisory device SV#1 are connected to a supervisory device controller SVP by signal wires through each of which wires an on/off signal is transmitted. Each of the supervisory devices SV#0 and SV#1 supplies to the supervisory device controller SVP a status signal S1 indicating whether or not a corresponding supervisory device (SV#0 or SV#1) is normal. The status signal S1 being in an on-state indicates that a corresponding supervisory device is normal. The status signal S1 being in an off-state indicates that a corresponding supervisory device is not normal. The supervisory device controller SVP supplies a first control signal S2 to the first supervisory device SV#0. When the first supervisory device SV#0 is to be active in a supervisory operation and to be inactive therein, the supervisory device controller SVP maintains the first control signal S2, for example, in the off-state and in the on-state respectively. On the other hand, when the second supervisory device SV#1 is to be active in the supervisory operation and to be inactive therein, the supervisory device controller SVP maintains the second control signal S22, for example, in the on-state and in the off-state respectively. That is, the relationship between the on and off states of the first control signal S2 and the activity and inactivity of the first supervisory device SV#0 is reciprocal to the relationship between the on and off states of the second control signal S22 and the activity and inactivity of the second supervisory device SV#1.

The supervisory device controller SVP supplies a third control signal S3 to a switching device LSW. When the third control signal S3 is in the off-state, the switching device LSW selectively connects the first supervisory device SV#0 to communication lines for devices in upper and lower hierarchies. On the other hand, when the third control signal S3 is in the on-state, the switching device LSW selectively connects the second supervisory device SV#1 to the communication lines for the devices in the upper and lower hierarchies.

The above signals S1, S2, S22 and S3 and meanings thereof are arranged as shown in the following Table-1.

TABLE 1

| S1 | ON : a corresponding SV is not normal |
| | OFF: a corresponding SV is normal |
| S2 | ON : SV#0 is active |
| | OFF: SV#0 is inactive |
| S22 | ON : SV#1 is inactive |
| | OFF: SV#1 is active |
| S3 | ON : SV#0 is selected |
| | OFF: SV#1 is selected |

Figure 3:
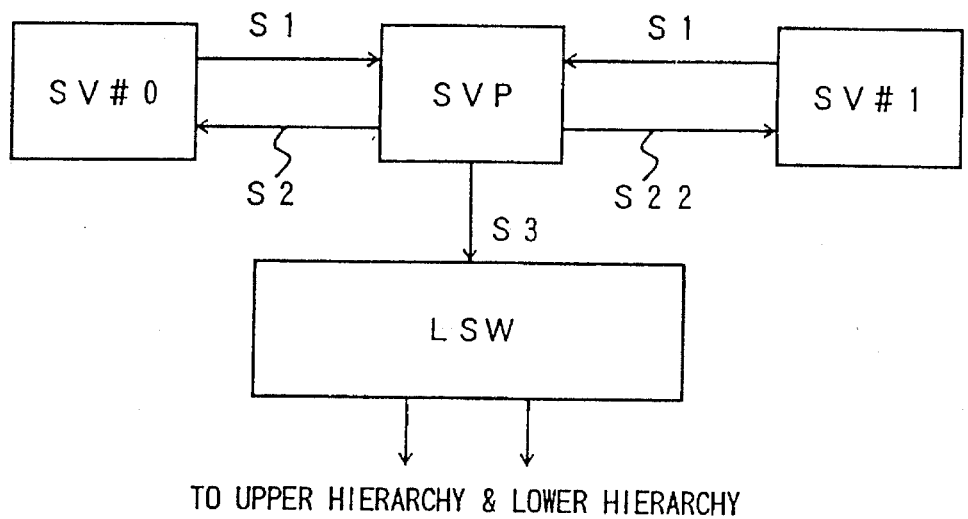
FIG. 3 is a block diagram illustrating the essential structure of a supervisory system according to a first embodiment of the present invention.
Figure 4:
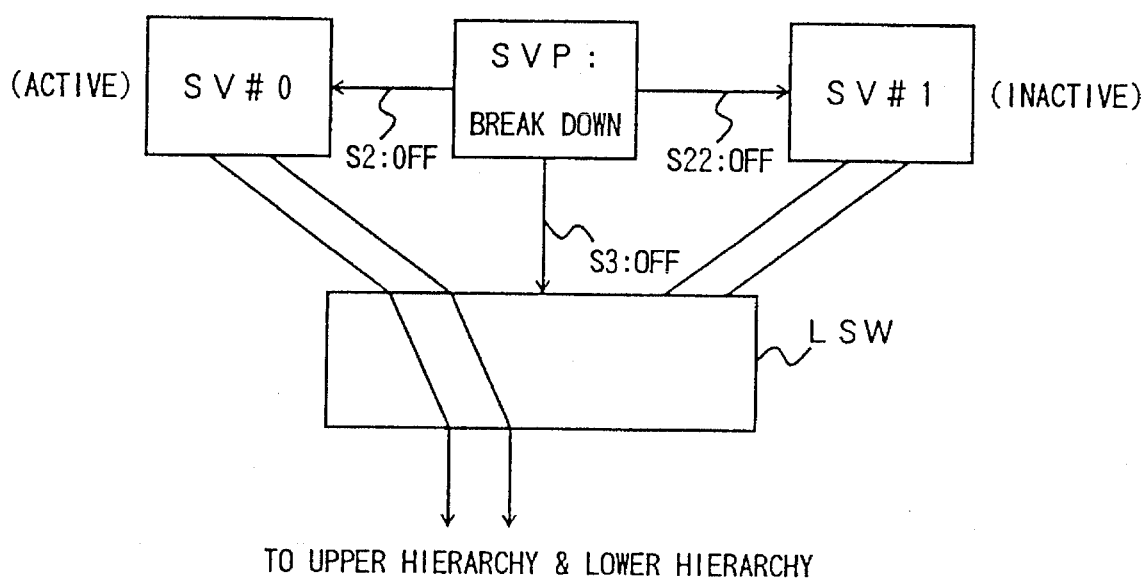
FIG. 4 is a block diagram illustrating the essential operation of a supervisory system according to the first embodiment of the present invention.

Operations are performed as follows in a system as shown in FIG. 3.

The supervisory device controller SVP is always monitoring the status signals S1 from the first and second supervisory devices SV#0 and SV#1. The supervisory device controller SVP controls states of the control signals S2, S22 and S3 with reference to the status signals S1 so that a supervisory device which is normal is always active and is connected by the switching device LSW to the communication lines for the devices in the upper and lower hierarchies in the supervisory system. The supervisory device (SV#0 or SV#1) connected to the communication lines for the devices in the upper and lower hierarchies gathers performance data of the network devices NE via the device in the lower hierarchy and supplies the performance data to the device in the upper hierarchy.

When the supervisory device controller SVP is troubled, all the control signals S2, S22 and S3 are in the off-state. In this case, the first and second supervisory devices SV#0 and SV#1 are compulsorily activated and deactivated respectively and the first supervisory device SV#1 is compulsorily connected to the communication lines for the devices in the upper and lower hierarchies, as shown in FIG. 4.

In the first embodiment of the present invention, even if one of the supervisory devices is troubled, the other supervisory device is connected to the communication lines for the devices in the upper and lower hierarchies. Thus, the performance data from the network equipments NE are continuously gathered by the other supervisory device. In addition, the relationship between the on and off states of the first control signal S2 and the activity and inactivity of the first supervisory device SV#0 is reciprocal to the relationship between the on and off states of the second control signal S22 and the activity and inactivity of the second supervisory device SV#1. If a malfunction of the supervisory device controller SVP occurs, all the control signals S2, S22 and S3 are maintained in the off-state. Thus, in this case, one of the supervisory devices SV#0 and SV#1 and the other supervisory device are automatically activated and deactivated respectively. The activated supervisory devices is then automatically connected to the communication lines for the devices in the upper and lower hierarchies. That is, even if the malfunction of the supervisory device controller SVP occurs, the performance data from the network equipments NE are continuously gathered by the supervisory device automatically activated.

A detailed description will now be given of the first embodiment of the present invention.

Figure 5:
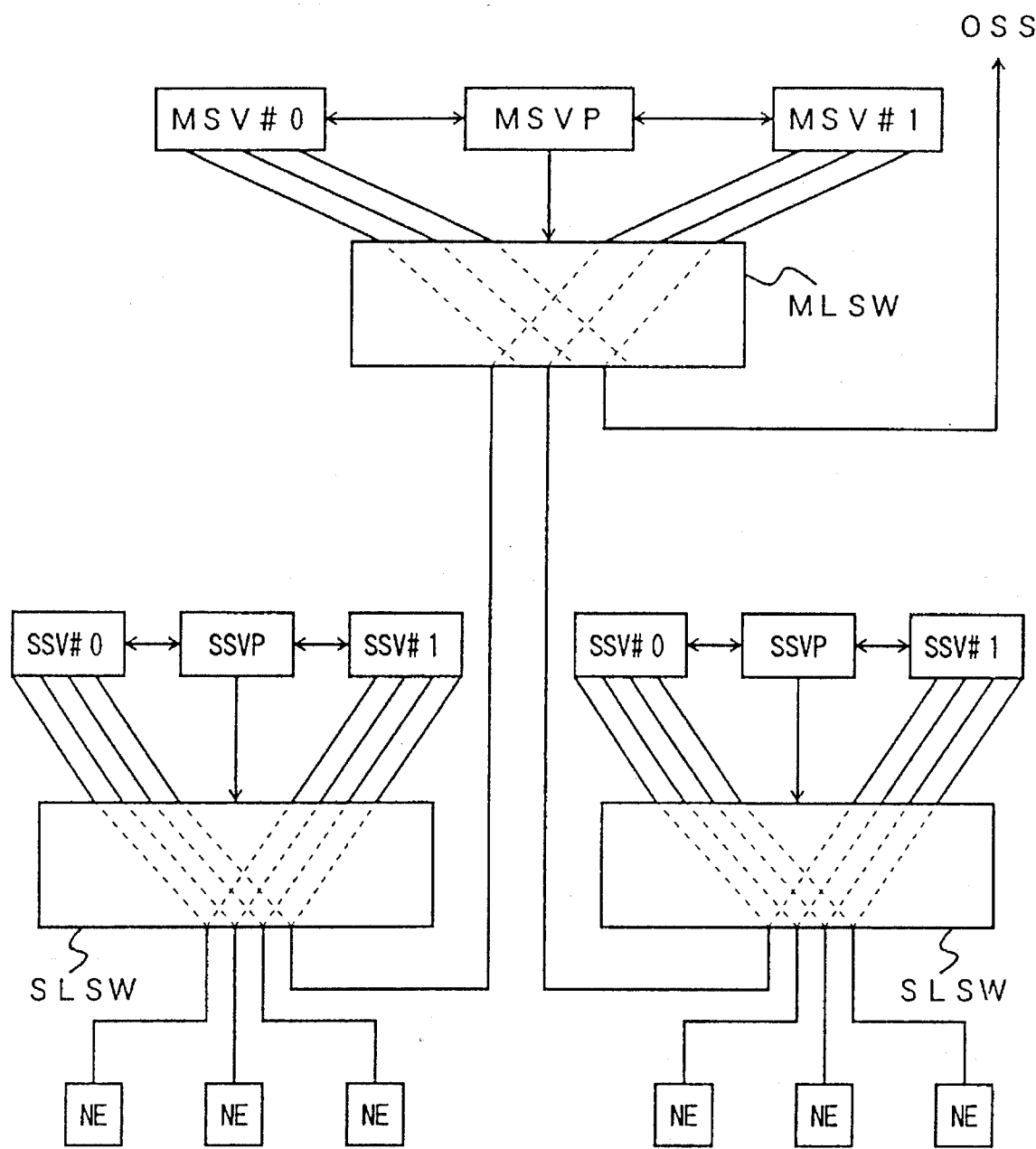
FIG. 5 is a block diagram illustrating a supervisory system according to the first embodiment of the present invention.

A supervisory system according to the first embodiment of the present invention is formed as shown in FIG. 5. Due to the multiplex of the subordinate supervisory device SSV and the middle supervisory device MSV shown in FIG. 1, the supervisory system as shown in FIG. 5 is formed. Referring to FIG. 5, a subordinate supervisory device controller SSVP is connected to a first subordinate supervisory device SSV#0, a second subordinate supervisory device SSV#1, a subordinate switching device SLSW by signal wires for signals which may have on and off states. The subordinate supervisory device controller SSVP controls the first subordinate supervisory device SSV#0 and the second subordinate supervisory device SSV#1 so that a subordinate supervisory device which is normal is active and the other subordinate supervisory device is inactive. The subordinate switching device SLSW is controlled by the subordinate supervisory device controller SSVP so that the normal subordinate supervisory device (SSV#0 or SSV#1) is connected to network equipments NE and a middle switching device MLSW in the upper hierarchy. A middle supervisory device MSVP is connected to a first middle supervisory device MSV#0, a second middle supervisory device MSV#1 and a middle switching device MLSW. The middle supervisory device controller controls the first middle supervisory device MSV#0 and the second middle supervisory device MSV#1 so that a middle supervisory device which is normal is active and the other middle supervisory device is inactive. The middle switching device MLSW controlled by the middle supervisory device controller MSVP so that the normal middle supervisory device (MSV#0 or MSV#1) is connected to an outranking system OSS and the subordinate switching device SLSW in the lower hierarchy.

Figure 6:
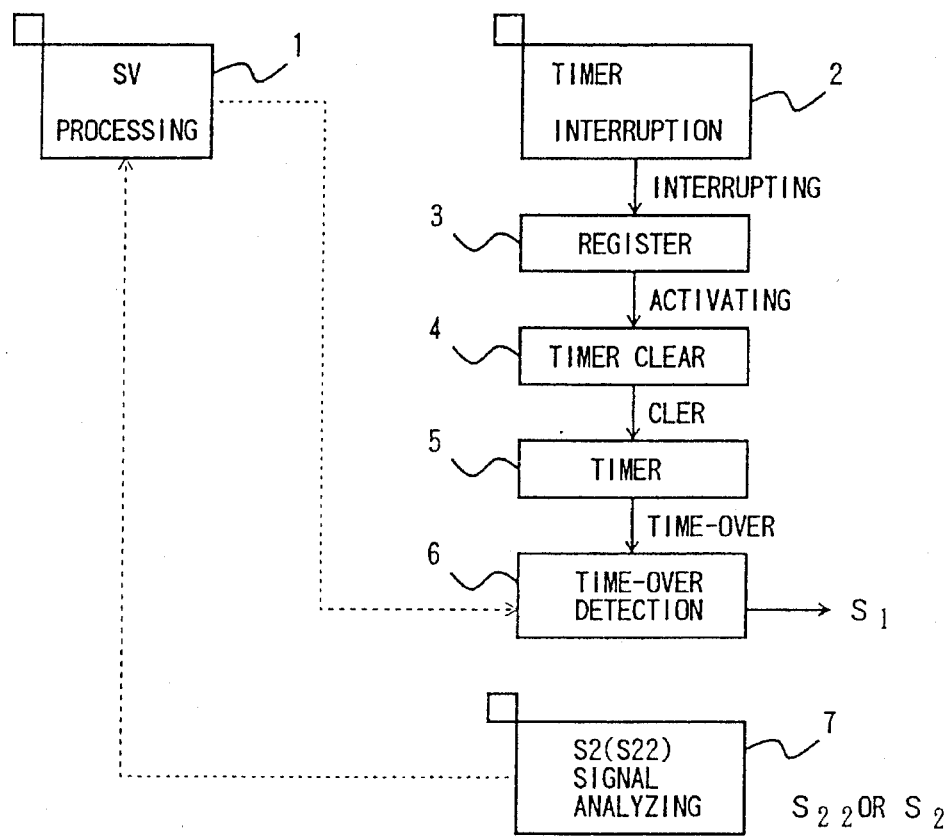
FIG. 6 is a block diagram illustrating the structure of each of a supervisory devices in the supervisory system shown in FIG. 5.

Each of the subordinate supervisory devices and each of the middle supervisory devices (hereinafter simply referred to as a supervisory device SV) are formed as shown in FIG. 6. Referring to FIG. 6, a supervisory device SV has an SV processing portion 1, a timer interruption processing portion 2 and a signal analyzing portion 7. A processing level of the timer interruption processing portion 2 is less than that of the SV processing portion 1. The timer interruption processing part 2 is activated by an interruption from an internal timer 5 and writes data into a register 3. When the data is written in the register 3, a timer clear portion 4 is activated, so that the internal timer 5 is cleared by the timer clear portion 4. In a normal state, the timer interruption to the timer interruption processing portion 2 and the clearing of the internal timer 5 are repeated. However, if the timer interruption to the timer interruption processing portion 2 and the clearing of the internal timer 5 are not performed due to a runaway of the SV processing part 1 or other malfunctions in the supervisory device SV, the internal timer 5 is not cleared and overflows. A time-over detection portion 6 outputs a status signal S1. The status signal S1 is being normally maintained in an on-state after the initial activation of the SV processing part 1. The status signal S1 is supplied to the supervisory device controller. When the time-over detection portion 6 detects that the internal timer 5 overflows, the time-over detection portion 6 switches the status signal S1 to be in an off-state. The signal analyzing portion 7 analyzes a control signal S2 or S22 supplied from the supervisory device controller SVP. The analyzing result obtained by the signal analyzing portion 7 is supplied to the SV processing portion 1.

Figure 7:
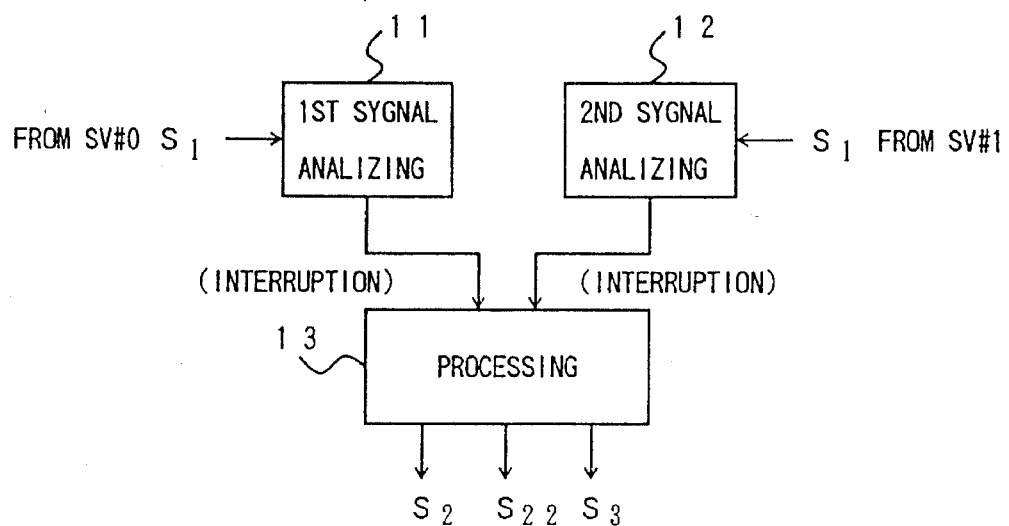
FIG. 7 is a block diagram illustrating the structure of each of supervisory device controller in the supervisory system shown in FIG. 5.

Each of the subordinate and middle supervisory device controller SSVP and MSVP (hereinafter simply referred to as a supervisory device controller SVP) is formed, for example, as shown in FIG. 7. Referring to FIG. 7, the supervisory device controller SVP has a first signal analyzing portion 11, a second signal analyzing portion 12 and a processing portion 13. The first signal analyzing portion 11 monitors and analyzes the status signal S1 supplied from the first supervisory device (SSV#0 or MSV#0, hereinafter simply referred to as SV#0). The second signal analyzing portion 12 monitors and analyzes the status signal supplied from the second supervisory device (SSV#1 or MSV#1, hereinafter simply referred to as SV#1). The first and second signal analyzing portion 11 and 12 supply interruption signals to the processing portion 13 when the status signals S1 are changed from being in the on-state to being in the off-state and vice versa.

Figure 8:
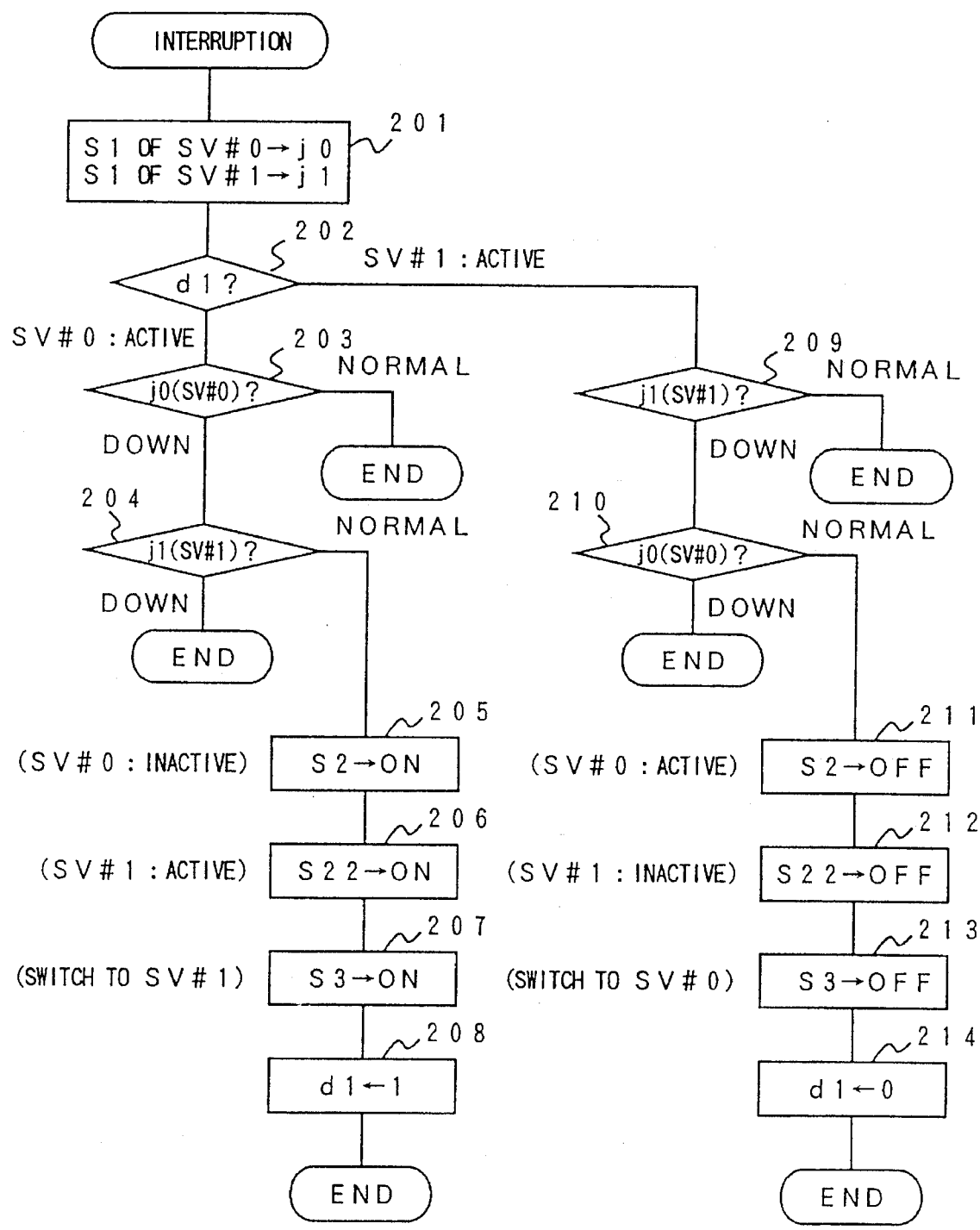
FIG. 8 is a flow chart illustrating a process executed by a processing part of the supervisory device controller.

When the interruption signal is supplied to the processing portion 13 from either the first signal analyzing portion 11 or the second signal analyzing portion 12, the processing portion 13 carries out a process as shown in FIG. 8.

The processing portion 13 controls flags d1, j0 and j1. The flag d1 indicates whether the first supervisory device SV#0 is active in the supervisory operation or the second supervisory device SV#1 is active in the supervisory operation. The flag jo indicates whether or not the first supervisory device SV#0 is normal. The flag j1 indicates whether or not the second supervisory device SV#1 is normal. The above flags d1, j0 and j1 are turned on and off in accordance with the following Table-2.

TABLE 2

| | |
|---|---|
| d1 | 0 (off) : SV#0 is active |
| | 1 (on) : SV#1 is active |
| j0 | 0 (off) : SV#0 is normal |
| | 1 (on) : SV#0 is not normal |
| j1 | 0 (off) : SV#1 is normal |
| | 1 (on) : SV#1 is not normal |

Referring to FIG. 8, in step 201, the flags j0 and j1 are respectively set based on the status signals S1 from the first and second supervisory devices SV#0 and SV#1. In step 202, it is determines whether the first supervisory device SV#0 or the second supervisory device SV#1 is active with reference to the flag d1. When it is determined that the first supervisory device SV#0 is active (d1=0) in step 202, the process is performed in accordance with steps 203 through 208. In step 203, the processing portion 13 determines whether or not the first supervisory device SV#0 is normal with reference to the flag j0. When it is determined that the first supervisory device SV#0 is normal (j0=0) in step 203, the process is completed. That is, the first supervisory device SV#0 continuously gathers performance data from the network equipments NE. On the other hand, when it is determined that the first supervisory device SV#0 is not normal (j0=1) in step 203, the processing portion 13 further determines whether or not the second supervisory device is normal with reference to the flag j1 in step 204. When it is determined that the second supervisory device is not normal (j1=1) in step 204, the process is completed. That is, in this case, neither the first supervisory device SV#0 nor the second supervisory device SV#1 is normal, and the supervisory of the network equipments NE under the supervisory devices SV#0 and SV#1 is interrupted. On the other hand, when it is determined that the second supervisory device SV#1 is normal (j1=0) step 204, the processing portion 13 makes both the control signals S2 and S22 be in the on-state in steps 205 and 206. Due to the control signals S2 and S22 being in the on-state, the first supervisory device SV#0 which is not normal and the second supervisory device SV#1 are respectively switched inactive and active (see Table-1). Then, in step 207, the processing portion 13 makes the control signal S3 be in the on-state. Due to the control signal S3 being in the on-state, the switching device (SLSW or MLSW, hereinafter simply referred to as LSW) switches from the first supervisory device SV#0 to the second supervisory device SV#1. Thus, the performance data from the network equipments NE is continuously gathered by the second supervisory device SV#1. After the control signal S3 is switched to the on-state in step 207, the flag d1 is set to "1" indicating that the second supervisory device SV#1 is active, in step 208.

When, in step 202, it is determined that the second supervisory device SV#1 is active (d1=1), the process is performed in accordance with steps 209 through 214, in the same manner as steps 203 through 208. That is, when it is determined that the second supervisory device SV#1 and the first supervisory device SV#0 are respectively not normal and normal, in steps 209 and 210, the processing portion 13 makes the control signals S2, S22 and S3 be in the off-state in steps 211, 212 and 213. Thus, the first supervisory device SV#0 and the second supervisory device SV#1 are respectively switched being active and being inactive. Then, the flag d1 is set to "0" in step 214. In this case, even if the second supervisory device SV#1 is troubled, the performance data from the network equipments NE is gathered by the first supervisory device SV#0.

Figure 9:
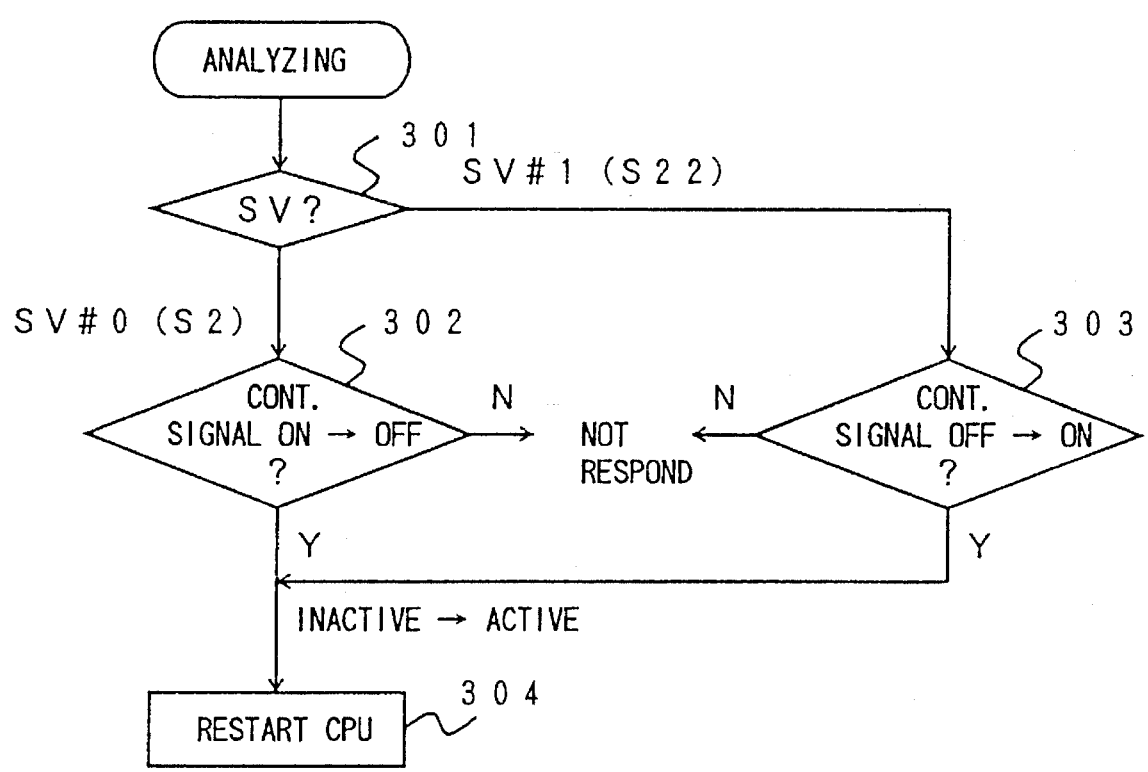
FIG. 9 is a flow chart illustrating a process executed by a signal analyzing part of the supervisory device.

While the supervisory device controller SVP is carrying out the above process, the signal analyzing portion 7 in each of the first and second supervisory devices SV#0 and SV#1 carries out a process as shown in FIG. 9.

Referring to FIG. 9, the signal analyzing portion 7 determines, in step 301, whether the control signal S2 to be supplied to the first supervisory device SV#0 or the control signal S22 to be supplied to the second supervisory device SV#1 is input thereto. When it is determined that the control signal S2 is input to the signal analyzing portion 7 in step 301, the signal analyzing portion 7 further determines whether or not the control S2 has been switched from the on-state to the off-state in step 302. When it is determined that the control signal S2 has been switched from the on-state to the off-state in step 302, the signal analyzing portion 7 recognizes that the first supervisory device SV#0 must be switched from being inactive to being active. Thus, in step 304, the signal analyzing portion 7 restarts a CPU of the SV processing portion 1 in the first supervisory device SV#0. On the other hand, it is determined that the control signal S2 is not switched from the on-state to the off-state in step 302, the signal analyzing portion 7 does not respond to the control signal S2.

When it is determined that the control signal S22 is input to the signal analyzing portion 7 in step 301, the signal analyzing portion 7 further determines whether or not the control signal S22 has been switched from the off-state to the on-state in step 303. When it is determined that the control signal S22 has been switched from the off-state to the on-state in step 303, the signal analyzing portion 7 recognizes that the second supervisory device SV#1 must be switched from being inactive to being active. Thus, in step 304, the signal analyzing portion 7 restarts a CPU of the SV processing portion 1 in the second supervisory device SV#1. On the other hand, it is determined that the control signal S22 is not switched from the off-state to the on-state in step 302, the signal analyzing portion 7 does not respond to the control signal S22.

When the CPU of the SV processing portion 1 is restarted, the supervisory device (SV#0 or SV#1) is switched from being inactive to being active. As a result, after the supervisory device gathers the performance data indicating the present state of the network equipments NE under the supervisory device, the supervisory for the network equipments NE are continuously performed.

When a malfunction of the supervisory device controller SVP occurs, all the control signals S2, S22 and S3 are compulsorily maintained in the off-state "0". In this case, if the second supervisory device SV#1 has been active until the malfunction of the supervisory device controller occurs, due to the processes in steps 302 and 303, the first supervisory device SV#0 is automatically switched from being inactive to being active and the second supervisory device SV#1 is automatically switched from being active to being inactive. The first supervisory device SV#0 then gathers the performance data indicating the present state of the network equipments NE under the first supervisory device SV#0, and the supervisory for the network equipments NE are continuously performed by the first supervisory device SV#0.

Figure 10A:
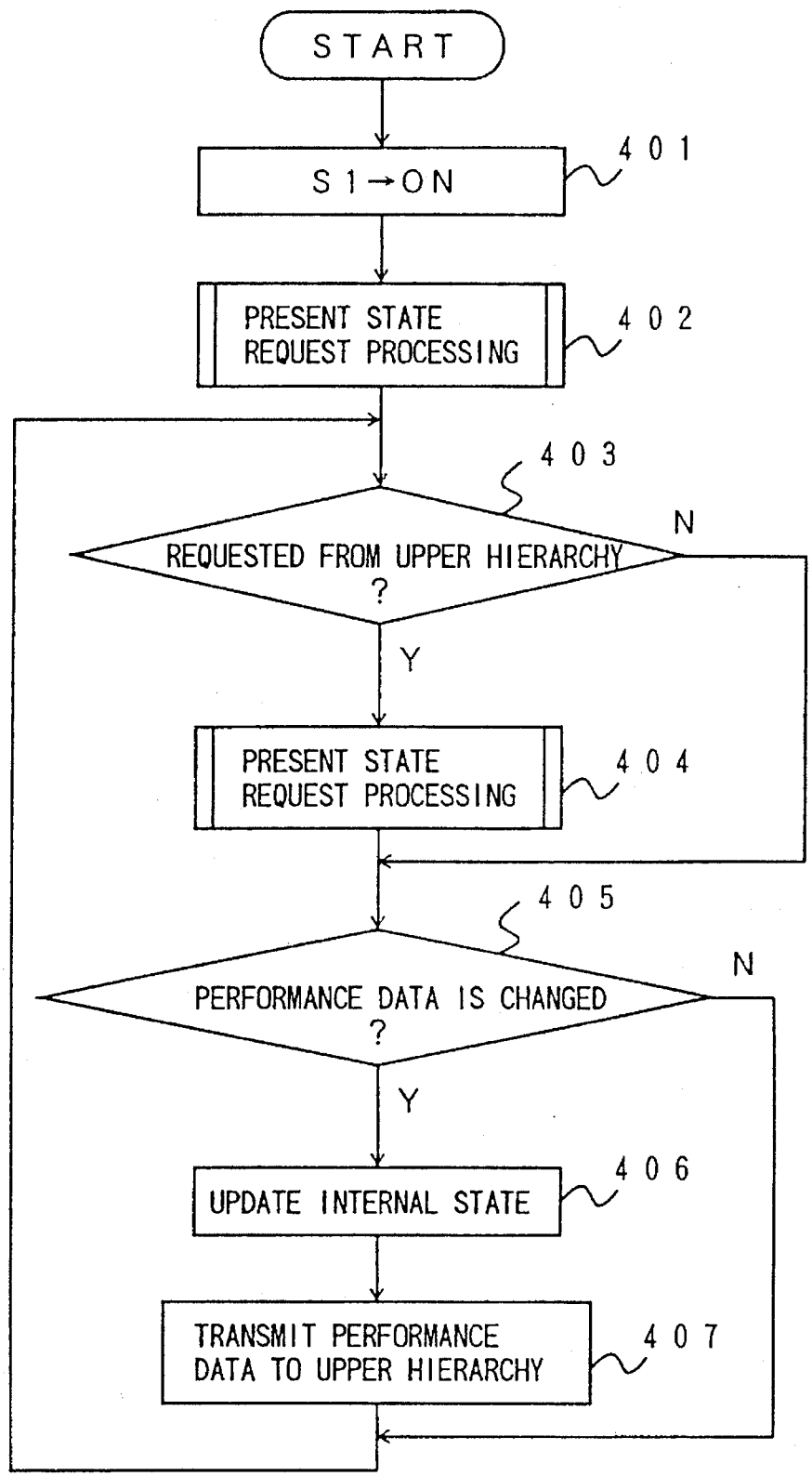
FIGS. 10A and 10B are flow charts illustrating processes executed by a processing part of the supervisory device.

The SV processing portion 1 of the supervisory device SV carries out a process as shown in FIG. 10A.

Referring to FIG. 10A, when the supervisory device SV is switched from being inactive to being active, the SV processing portion 1 makes the status signal S1 be in the on-state which state indicates the supervisory device SV is normal in step 401. Then, in step 402, the SV processing portion 1 performs a present state request processing for gathering the performance data indicating the present state of the network equipments NE under the supervisory device. After the present state request processing is completed in step 402, a normal supervisory process is carried out. In step 403, the SV processing portion 1 determines whether or not a request for gathering the performance data indicating the present state of the network equipments NE is supplied from a supervisory device in the upper hierarchy. If the request is supplied from the supervisory device in the upper hierarchy, the SV processing portion 1 performs the present state request processing in step 404 in the same manner as in step 402. When it is determined that the request is not supplied from the supervisory device in the upper hierarchy in step 403, or when the present state request processing is completed in step 404, the SV processing portion 1 determines whether or not information indicating that the performance data for the network equipments NE has been changed is supplied from devices in the lower hierarchy in step 405. When it is determined that the information regarding the change of the performance data is supplied from the devices in the lower hierarchy in step 405, the SV processing portion 1 updates the internal state thereof based on the new performance data for the network equipments NE in step 406. After this, the new performance data is sent from the SV processing portion 1 to a supervisory device in the upper hierarchy in step 407. On the other hand, when it is determined that the information regarding the change of the performance data for the network equipments NE is not supplied from the devices in the lower hierarchy in step 405, steps 406 and 407 are skipped. In the normal supervisory process, steps 403 through 407 are repeated.

Figure 10B:
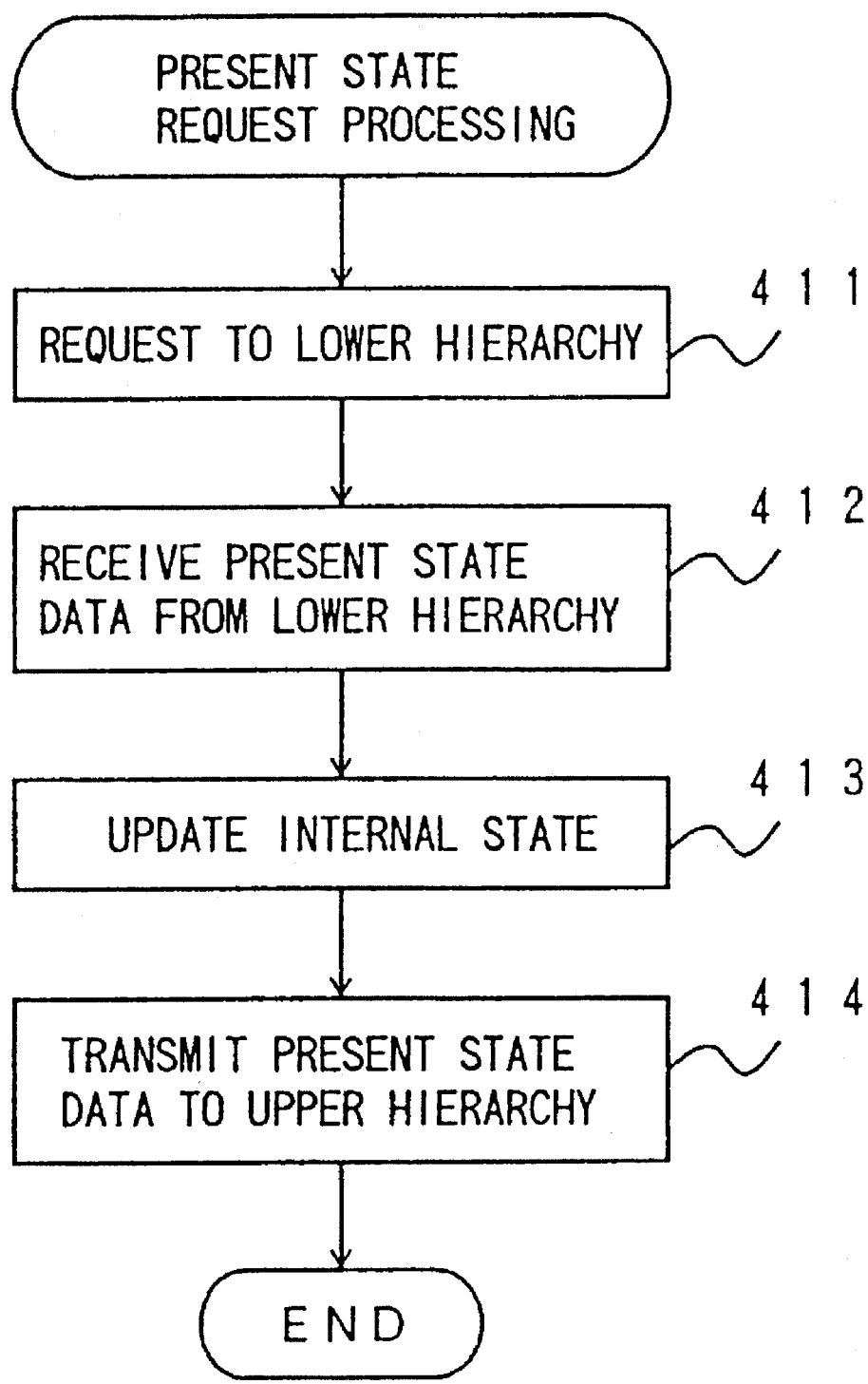

The present state request processing is performed in accordance with a flow chart shown in FIG. 10B.

Referring to FIG. 10B, the SV processing portion 1 outputs a present state gathering request to the devices in the lower hierarchy in step 411. In response to the present state gathering request, the performance data indicating the present state of the network equipments NE are supplied to the SV processing portion 1 via the devices in the lower hierarchy in step 411. The SV processing portion 1 updates the internal state thereof based on the performance data indicating the present state of the network equipments NE in step 413. Then, the performance data received by the SV processing portion 1 is transmitted to a device in the upper hierarchy in step 414.

Figure 11:
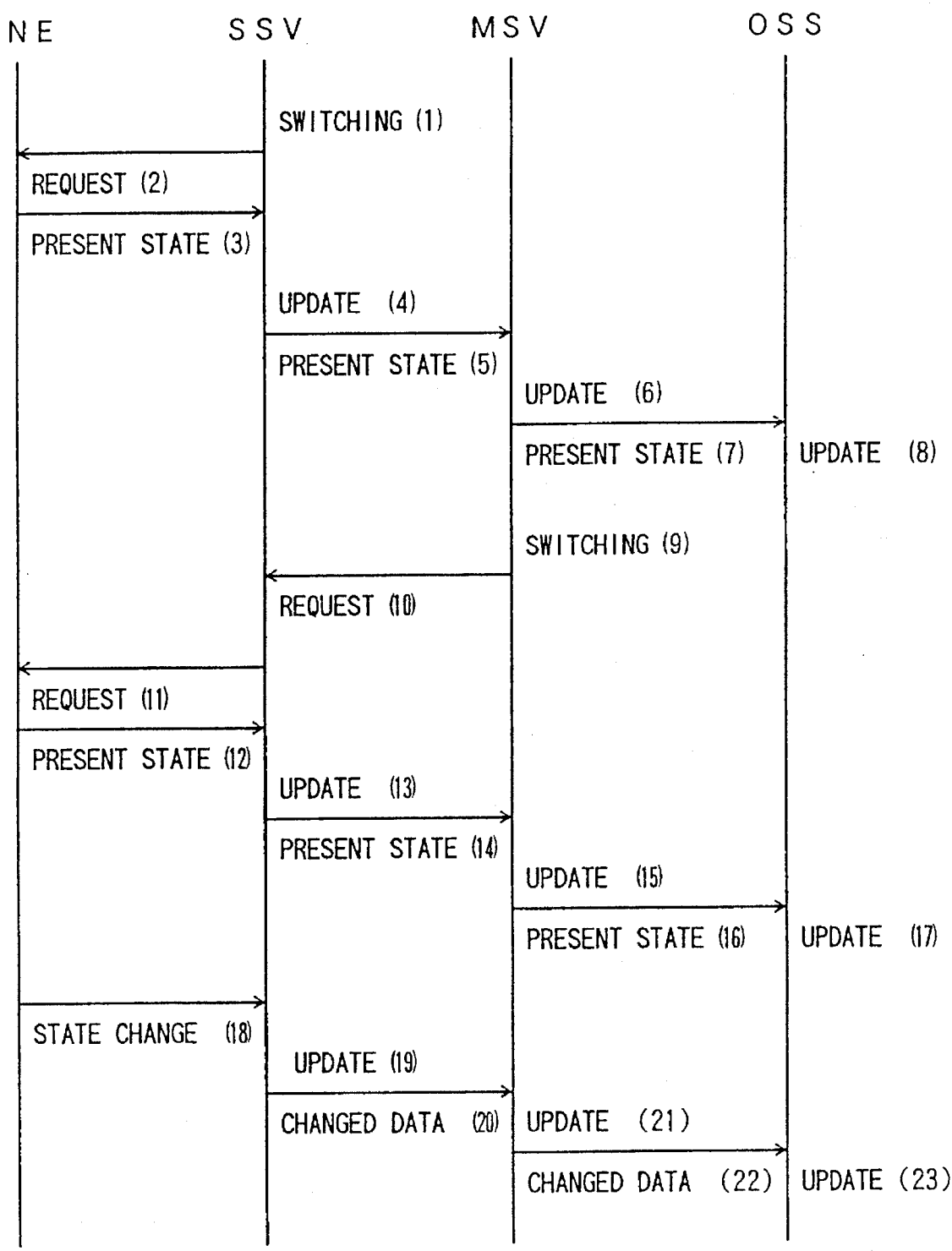
FIG. 11 is a diagram illustrating a communication sequence in the supervisory system shown in FIG. 5.

FIG. 11 shows examples of communication sequence in the supervisory system in three cases where a subordinate supervisory device SSV is changed to be active, a middle supervisory device is changed to be active, and the normal supervisory process is performed.

Referring to FIG. 11, when a subordinate supervisory device SSV is changed to be active (1), the subordinate supervisory device SSV outputs the present state gathering request to the network equipments NE thereunder (2). The network equipments NE supply the performance data indicating the present state thereof to the subordinate supervisory device SSV (3) in response to the present state gathering request from the subordinate supervisory device SSV. When receiving the performance data, the subordinate supervisory device SSV updates the internal state based on the performance data (4). Then, the performance data indicating the present state of the network equipments NE is supplied from the subordinate supervisory device SSV to the middle supervisory device MSV in the upper hierarchy (5). When receiving the performance data from the subordinate supervisory device SSV, the middle supervisory device MSV updates the internal state based on the performance data (6). After that, the performance data indicating the present state of the network equipments NE is , supplied from the middle supervisory device MSV to the outranking system OSS (7). When receiving the performance data, the outranking system OSS updates the internal state based on the performance data (8).

When the middle supervisory device MSV is changed to be active (9), the middle supervisory device MSV outputs the present state gathering request (10). The present state gathering request output from the middle supervisory device MSV is supplied to the network equipments NE via subordinate supervisory devices SSV coupled to the middle supervisory device MSV [(10) (11)]. In response to the present state gathering request, the network equipments NE output the performance data indicating the present state thereof (12). The performance data indicating the present state of the network equipments NE is serially transmitted to the outranking system OSS via the subordinate supervisory devices SSV and the middle supervisory device MSV [(12) (14) (16)]. The subordinate supervisory devices SSV, the middle supervisory device MSV and the outranking system OSS update the internal states thereof based on the performance data supplied from the lower hierarchy [(13) (15) (17)].

In the supervisory system, when a supervisory device SV in any hierarchy is changed to be active, the performance data indicating the present state of the network equipments NE is always gathered, in accordance with the present state gathering request output from the supervisory device changed to be active, to the outranking system OSS via the supervisory devices in the lower hierarchies. Thus, even if a supervisory device SV in any hierarchy is trouble, the supervisory system can normally survey the network equipments NE continuously.

In the normal supervisory process, when a state (e.g. an error bit rate) of a network equipment NE is changed, performance data indicating the changing state of the network equipment NE is supplied to a subordinate supervisory device SSV (18). The performance data indicating the changed state of the network equipment NE is further sequential transmitted from the subordinate supervisory device SSV to the outranking system OSS via the middle supervisory device MSV [(20) (22)]. The subordinate supervisory device SSV, the middle supervisory device MSV and the outranking system OSS update the internal sate based on the performance data supplied from the lower hierarchy [(19) (21) (23)].

In the above supervisory system, every time the state of the network equipments is changed, the performance data indicating the changed state is gathered to the outranking system OSS via the supervisory devices in the lower hierarchies. That is, the supervisory system always survey the network equipments NE.

Figure 12:
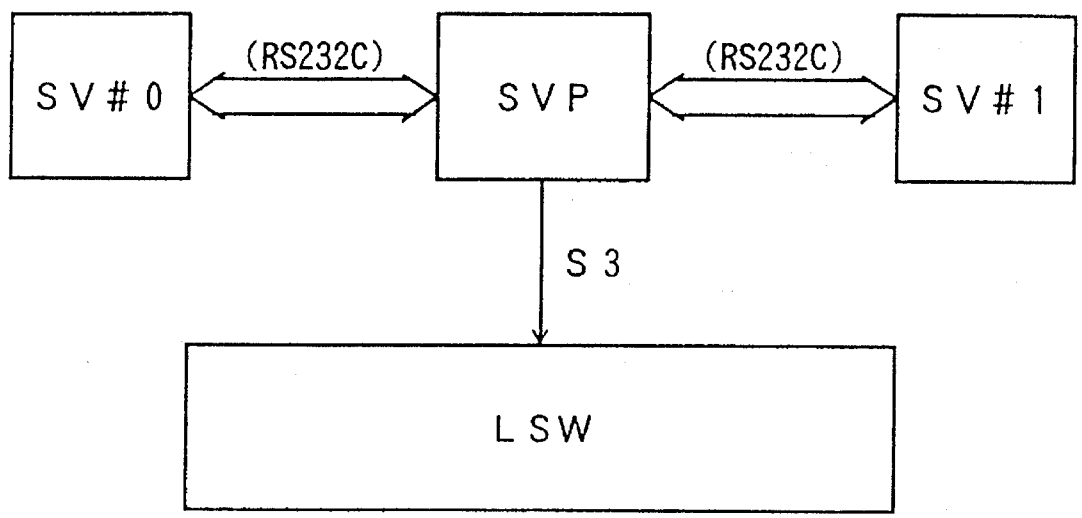
FIG. 12 is a block diagram illustrating an essential structure of a supervisory system according to a second embodiment of the present invention.

A description will be given, with reference to FIG. 12, of the principle of a second embodiment of the present invention.

A supervisory system according to the second embodiment hierarchically surveys a plurality of network equipments as shown in FIG. 1 or FIG. 2. In each hierarchy of the supervisory system, each supervisory device (SSV and MSV shown in FIG. 1 or P-SV, R-SV and X-SV shown in FIG. 2) is duplicated as shown in FIG. 12. Referring to FIG. 12, a first supervisory device SV#0 and a second supervisory device SV#1 are connected to a supervisory device controller SVP by communication lines (e.g. RS232C) through each of which lines data indicating messages is transmitted. The first and second supervisory devices SV#0 and SV#1 send status messages indicating whether or not the supervisory devices SV#0 and SV#1 are normal to the supervisory device controller SVP via the communication lines. The supervisory device controller SVP outputs response messages to the supervisory devices SV#0 and SV#1 in response to the status messages. The supervisory device controller SVP outputs the control signal S3 in accordance with the status messages from the supervisory devices SV#0 and SV#1 to a switching device LSW. The switching device LSW carries out a switching operation in the same manner as that in the system shown in FIGS. 3 and 4.

A detailed description will now be given of the second embodiment of the present invention.

Figure 13:
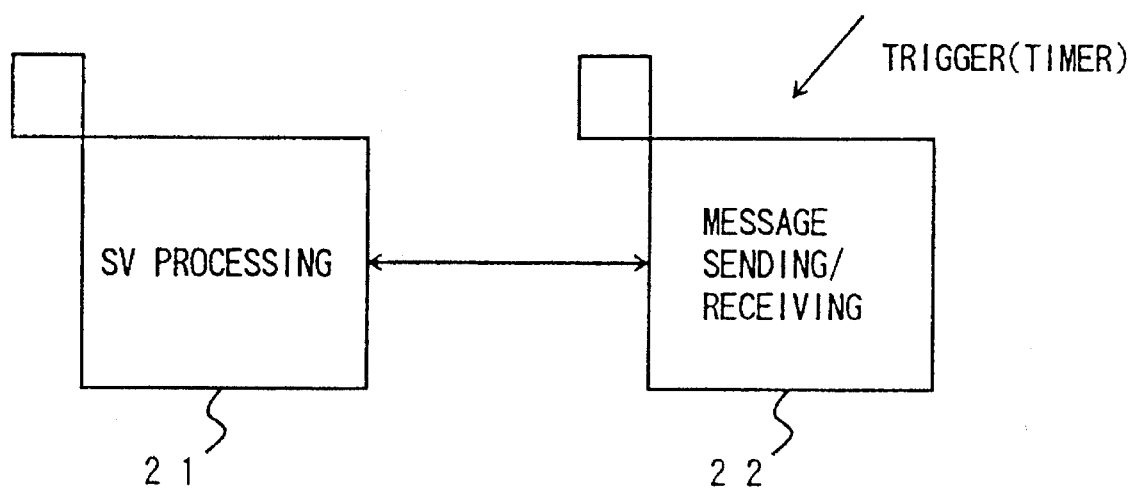
FIG. 13 is a block diagram illustrating a structure of a supervisory device controller shown in FIG. 12.

The a supervisory system according to the second embodiment of the present invention has the same structure as that according to the first embodiment as shown in FIG. 5. In each hierarchy, each supervisory device is duplicated as shown in FIG. 12. Each of the first and second supervisory devices SV#0 and SV#1 has an SV processing portion 21 and a message sending/receiving portion 22 as shown in FIG. 13. The message sending/receiving portion 22 operates in accordance with a flow chart shown in FIG. 14.

Figure 14:
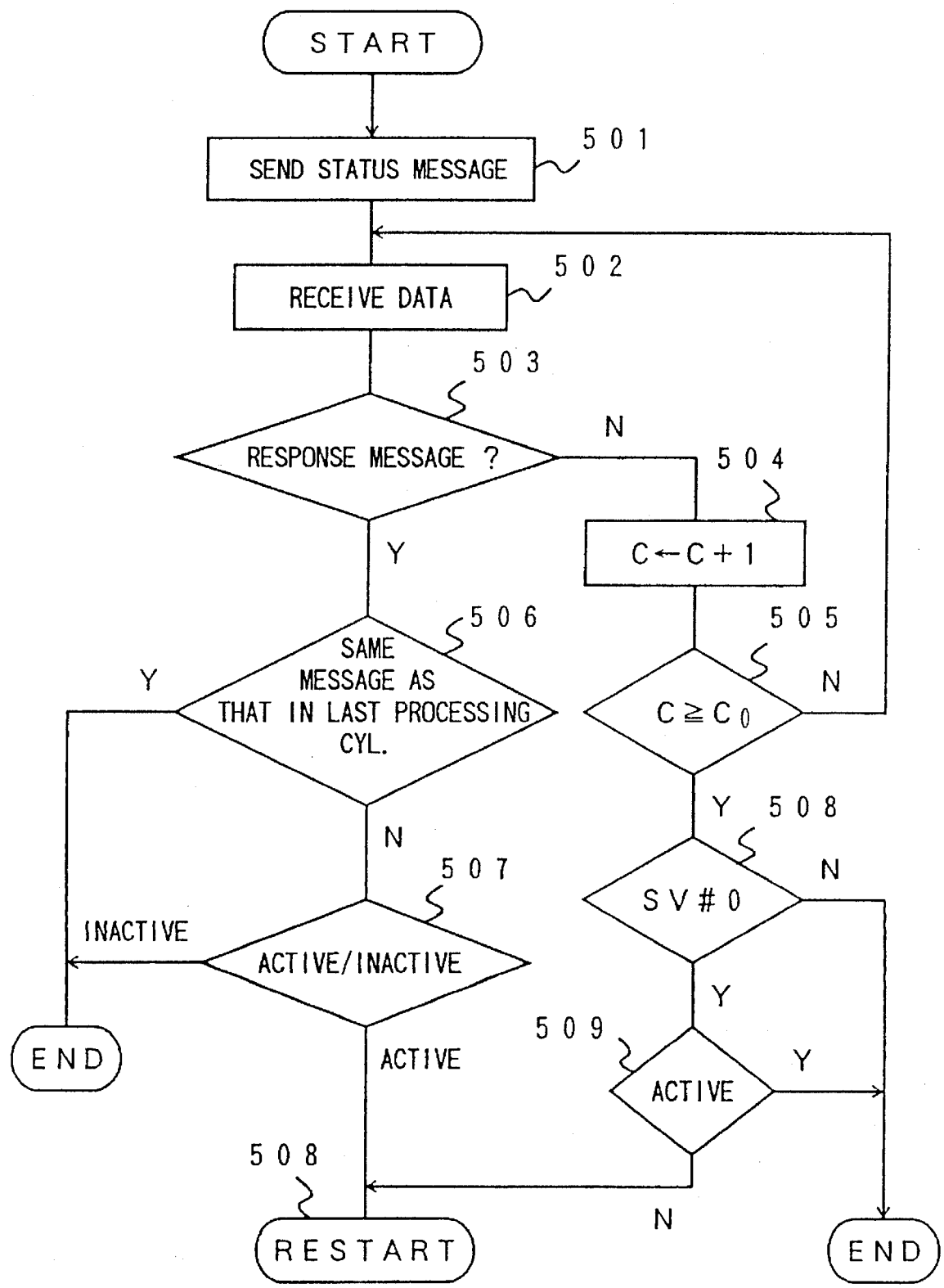
FIG. 14 is a flow chart illustrating a process executed by a telegraphic message send and receive part of the supervisory device controller.

Referring to FIG. 14, in step 501, the sending/receiving portion 22 sends the status message to the supervisory device controller SVP, and the message sending/receiving portion 22 receives data from the communication data line (the RS232C) in step 502. Then, in step 503, it is determined whether or not the received data obtained in step 502 is the response message from the supervisory device controller SVP. When the received data is not response message, a counter C is incremented by one in step 504 and it is determined whether or not the count value of the counter C reaches a predetermined value Co in step 505. In a case where the count value does not reach the predetermined value Co, the process in steps 502 through 505 is repeated. In this process, when it is determined that the input data is the response message from the supervisory device controller SVP in step 503, the message sending/receiving portion 22 determines whether or not the received response message is the same as that received in the last processing cycle in step 506. When the received response message is the same as that received in the last processing cycle, the process is completed, and the supervisory device SV is maintained in the present state (active or inactive). When the received response message differs from the recieved in the last processing cycle, the message sending/receiving portion 22 determines based on the received message whether the supervisory device SV is to be active or to be inactive in step 507. When it is determined that the supervisory device SV is to be active, the message sending/receiving 22 restarts the SV processing portion 21 so that the supervisory device SV is to be active in the supervisory operation. When it is determined that the supervisory device SV is to be inactive in step 507, the process is completed.

On the other hand, when the count value of the counter C reaches the predetermined value Co before the response message from the supervisory device controller SVP is received, the process proceed from step 505 to step 508. In step 508, the message sending/receiving portion 22 determines whether or not this supervisory device is the first supervisory device SV#0. In a case of the first supervisory device SV#0, it is further determined whether or not the first supervisory device SV#0 is active in step 509. When the first supervisory device SV#0 is inactive, the message sending/receiving portion 21 restarts the SV processing portion of the first supervisory device SV#0 so that the first supervisory device SV#0 is changed to be active. If this supervisory device is the second supervisory SV#1 or if the first surpervisory device SV#0 is active, the process is completed.

According to the above process, even if the response message is not received because a malfunction of the supervisory device controller occurs, the first supervisory device SV#0 automatically becomes active in the supervisory operation.

Figure 15:
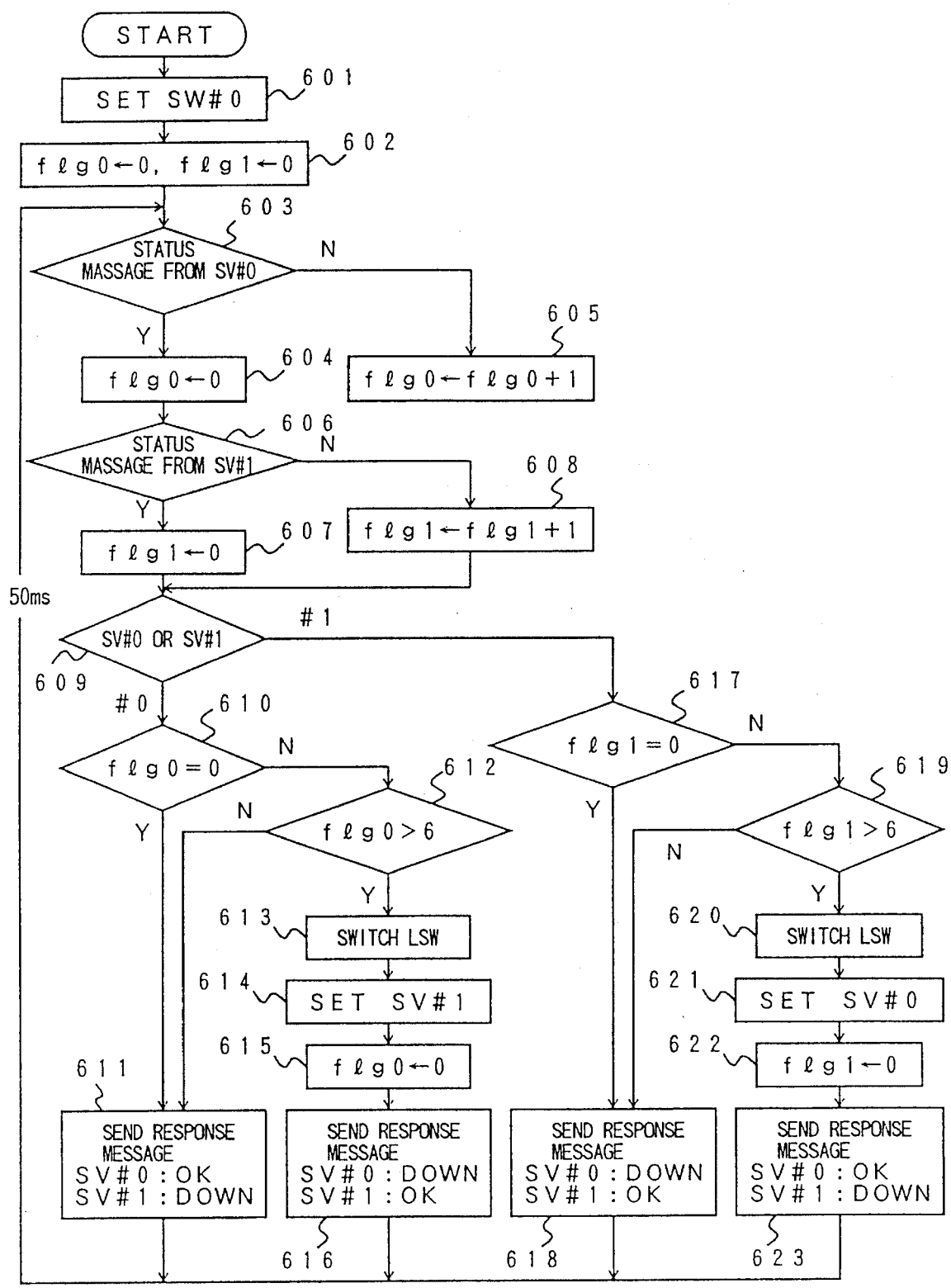
FIG. 15 is a flow chart illustrating a process executed by a processing part of the supervisory device controller.

The supervisory device controller SVP supplies to response messages to the supervisory devices SV#0 and SV#1 in accordance with a flow chart shown in FIG. 15.

Referring to FIG. 15, in step 601, the supervisory device controller SVP sets in a register information (a flag) that the first supervisory device SV#0 is to be active in the supervisory operation. In step 602, a first flag counter (flg 0) is initialized to "0" and a second flag counter (flg 1) is also initialized to "0". After that, the supervisory device controller SVP determines whether or not a status message from the first supervisory device SV#0 is received in step 603. If the status message from the first supervisory device SV#0 has been received, the first counter flag (flg 0) is maintained at "0" in step 604. Then, in this case, the process proceeds to step 609 via steps 606 and 608. In step 609, it is determined, based on the status message received and the information set in the register in step 601, whether or not the first supervisory device SV#0 or the second supervisory device SV#1 is to be active in the supervisory operation. Now, as the first supervisory device SV#0 is to be active, the process proceeds to step 610. In step 610, the supervisory device controller SVP then determines whether or not the first flag counter (flg 0) is "0". As the first flag counter (flg 0) is maintained at "0" in step 604, the supervisory device controller SVP supplies a first response message to the first and second supervisory devices SV#0 and SV#1 in step 611. The first response message indicates that the first supervisory device SV#0 is to be active in the supervisory operation and the second supervisory device SV#1 is to be inactive in the supervisory operation.

Every time the status message from the first supervisory device SV#0 is received, the above process is performed. Thus, the supervisory device controller SVP supplies the first response message (SV#0: active, SV#1: inactive) to the first and second supervisory devices SV#0 and SV#1 in response to the status message from the first supervisory device SV#0.

On the other hand, when, in step 603, the supervisory device controller SVP determines that the status message from the first supervisory device SV#0 is not received, the first flag counter (flg 0) is incremented by one in step 605. In this case, in step 610, it is determined that the first flag counter (flg 0) is not "0". Thus, the supervisory device controller SVP further determines whether or not the first flag counter (flg 0) exceeds "6" in step 612. When the first flag counter (flg 0) does not exceed "6", the supervisory device controller SVP supplies to the first response message to the first and second supervisory devices SV#0 and SV#1. During no status message from the first supervisory device SV#0, the above process is repeated until the first flag counter (flg 0) exceeds "6". When the first flag counter (flg 0) exceeds "6", the supervisory device controller SVP detects that the first supervisory device SV#0 has been troubled. The above process (steps 603 through 611) needs about 50 milliseconds to complete one cycle thereof. That is, when the status message is not received for about 300 milliseconds (50 milliseconds×6), the supervisory device controller SVP detects that the first supervisory device SV#0 has been troubled.

When the supervisory device controller SVP detects that the first supervisory device SV#0 has been troubled, the process proceeds from step 612 to step 613. In step 613, the control signal S3 is changed from to be in the off-state to be in the on-state. Based on the control signal S3 being in the on-state, the switching device LSW is switched from the first supervisory device SV#0 to the second supervisory device SV#1 so that the second supervisory device SV#1 is coupled to the upper and lower hierarchies. The supervisory device controller SVP then sets information that the second supervisory device SV#1 is to be active in the supervisory operation in step 614, and the first flag counter (flg 0) is reset to "0" in step 615. After this, in step 616, the supervisory device controller SVP supplies a second response message to the first and second supervisory devices SV#0 and SV#1. The second response message indicates that the first supervisory device SV#0 is to be inactive in the supervisory operation and the second supervisory device SV#1 is to be active in the supervisory operation.

In a state where the second supervisory device SV#1 is active and coupled to the upper and lower hierarchies by the switching device LSW, the supervisory device controller SVP sends the second response message (SV#0: inactive, SV#1: active) to the first and second supervisory devices SV#0 and SV#1 in response to the receiving of the status message from the second supervisory device SV#1, in the same manner as in a case where the first supervisory device is active in the supervisory operation. In this case, if the status message from the second supervisory device SV#1 is not received for about 300 milliseconds, the supervisory device controller SVP detects that the second supervisory device SV#1 is troubled, in the same manner as in a case of the first supervisory device SV#0. That is, the process is carried out in accordance with steps 619 through 623 corresponding to steps 612 through 616. As a result, the supervisory device to be active is switched from the second supervisory device SV#1 to the first supervisory device SV#0 by the switching device LSW and the supervisory device controller SVP supplies the first response message (SV#0: active, SV#1: inactive) to the first and second supervisory devices SV#0 and SV#1.

The supervisory operation in the supervisory system according to the second embodiment is almost the same as that in the supervisory system according to the first embodiment indicated in FIGS. 10A, 10B and 11.

A description will now be given of a third embodiment of the present invention. The supervisory system according to the third embodiment has a hierarchical structure as shown in FIG. 5, and, in each hierarchy, each supervisory device is duplicated as shown in FIG. 12. That is, each of the first and second supervisory devices SV#0 and SV#1 is connected to the supervisory device controller SVP by the communication line RS232C.

The communication line RS232C includes signal wires DR (Data set Ready), ER (Data terminal Ready), RS (Request to Send) and CS (Clear to Send) and other signal wires. In the third embodiment, the above signal wires DR and CS are used for sending status signals and control signals between each of the supervisory devices SV#0 and SV#1 and the supervisory device controller SVP. The communication line RS232C between the first supervisory device SV#0 and the supervisory device controller SVP includes the signal wires DR(0) and CS(0). The communication line RS232C between the second supervisory device SV#1 and the supervisory device controller SVP includes the signal wires DR(1) and CS(1). In this case, on and off states of status signals transmitted from the supervisory devices SV#0 and SV#1 to the supervisory device controller SVP via the signal wires DR(0), DR(1), CS(0) and CS(1) are defined as shown in Table-3. The status signals correspond to the status signal S1 described in the first embodiment.

TABLE 3

| IN DR(0) | OFF : SV#0 is troubled |
| | ON : SV#0 is normal |
| IN CS(0) | OFF : SV#0 is troubled |
| | ON : SV#0 is normal |
| IN DR(1) | OFF : SV#1 is troubled |
| | ON : SV#1 is normal |
| IN CS(1) | OFF : SV#1 is troubled |
| | ON : SV# is normal |

The on and off states of control signals transmitted from supervisory device controller SVP to the supervisory devices SV#0 via the signal wires DR(0) and CS(0) are defined as shown in Table-4. The control signals correspond to the control signal S2 described in the first embodiment.

TABLE 4

| IN DR(0) | OFF : SV#0 is active |
| | ON : SV#1 is inactive |
| IN CS(0) | OFF : SV#0 is active |
| | ON : SV#0 is inactive |

The on and off states of control signals transmitted from supervisory device controller SVP to the supervisory devices SV#1 via the signal wires DR(1) and CS(1) are defined as shown in Table-5. The control signals correspond to the control signal S22 described in the first embodiment.

TABLE 3

| IN DR(1) | OFF : SV#1 is active |
| | ON : SV#0 is inactive |
| IN CS(0) | OFF : SV#1 is active |
| | ON : SV#0 is inactive |

Figure 16:
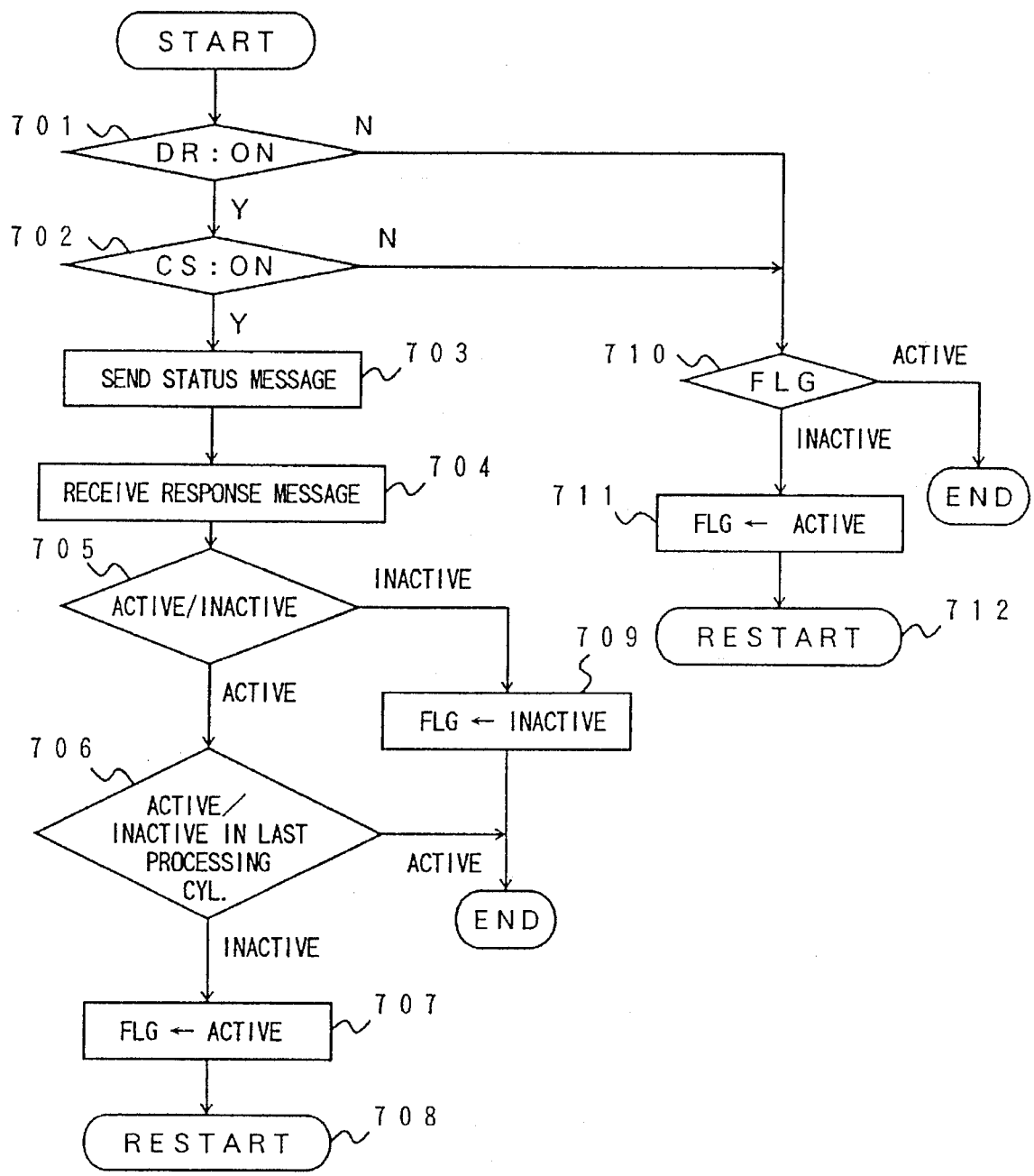
FIG. 16 is a flow chart illustrating an example of a send and receive processing in a supervisory device according to a third embodiment of the present invention.

The sending/receiving portion of the first supervisory device SV#0 operates in accordance with a flow chart shown in FIG. 16.

Referring to FIG. 16, in steps 701 and 702, it is determined whether or not control signals transmitted from the supervisory device controller SVP through the signal wires DR(0) and CS(0) are in the on-state. When the control signals in both the signal wires DR(0) and CS(0) are in the on-state, the first supervisory device SV#0 sends the status message to the supervisory device controller SVP in step 703. After this, the first supervisory device SV#0 receives the response message output from the supervisory device controller SVP in response to the status message, in step 704. The first supervisory device SV#0 determines, based on the response message, whether or not the first supervisory device SV#0 is to be active in the supervisory operation in step 705. When it is determined that the first supervisory device SV#0 is to be active in step 705, the first supervisory device SV#0 further determines, in step 706, whether or not it was determined to be active in step 705 in the last processing cycle. When it was determined to be active in step 705 in the last processing cycle, the first supervisory device SV#0 is maintained to be active. On the other hand, when it was determined to be inactive in step 705 in the last processing cycle, a flag is set to be active in step 707. After this, the first supervisory device SV#0 is restarted so as to be active in the supervisory operation. On the other hand, when it is determined based on the response message from the supervisory device controller SVP that the first supervisory device SV#0 is to be inactive, the flag is set to be inactive in step 709.

If the supervisory device controller SVP breaks down, the control signals to be sent through the signal wires DR(0) and CS(0) are compulsorily changed to be in the off-state. In this case, the first supervisory device SV#0 determines that the control signals in signal wires DR(0) and CS(0) are in the off-state in steps 701 and 702. Then, the first supervisory device SV#0 further determines whether the flag is set to be active or to be inactive in step 710. When the flag is set to be active, the first supervisory device SV#0 is maintained to be active in the supervisory operation. On the other hand, when it is determined that the flag is set to be inactive in step 710, the flag is set to be active in step 711. The first supervisory device SV#0 is restarted in step 712 so as to be active in the supervisory operation.

According to the process in steps 710 through 712, when the supervisory device controller SVP breaks down, the first supervisory device SV#0 is automatically changed to be active in the supervisory operation.

Figure 17:
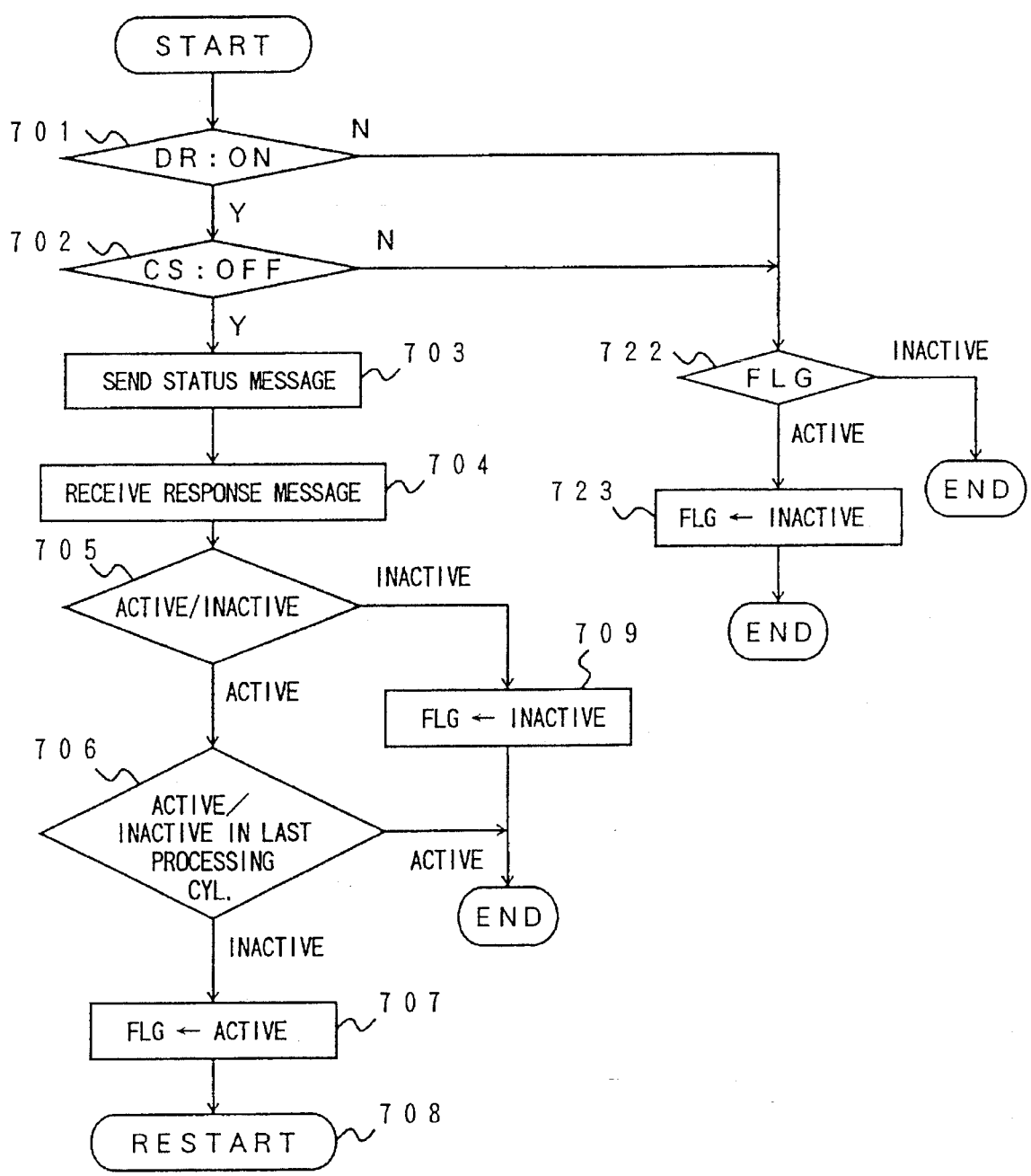
FIG. 17 is flow chart illustrating an example of a send and receive processing in a supervisory device according to the third embodiment of the present invention.

The sending/receiving portion of the second supervisory device SV#1 operates in accordance with a flow chart shown in FIG. 17.

The second supervisory device SV#1 monitors the state of the control signals in the signal wires DR(1) and CS(1) in steps 701 and 702. When the second supervisory device SV#1 determines that the control signals in both the signal wires DR(1) and CS(1) are in the on-state, the process is performed in accordance with steps 703 through 709, in the same manner as the process in the first supervisory device SV#0. On the other hand, if the control signals in the signal wires DR(1) and CS(1) are in the off-state (the supervisory device SVP breaks down), the process is performed in steps 722 and 723. That is, it is determined whether the flag is set to be active or to be inactive in step 722. In a case where the flag is set to be inactive, the second supervisory device SV#1 is maintained to be inactive. When it is determined that the flag is set to be active in step 722, the flag is set to be inactive in step 723. The second supervisory device SV#1 is compulsorily changed to be inactive in the supervisory operation. That is, when the supervisory device controller SVP breaks down, the second supervisory device SV#1 is automatically changed to be in active.

Figure 18:
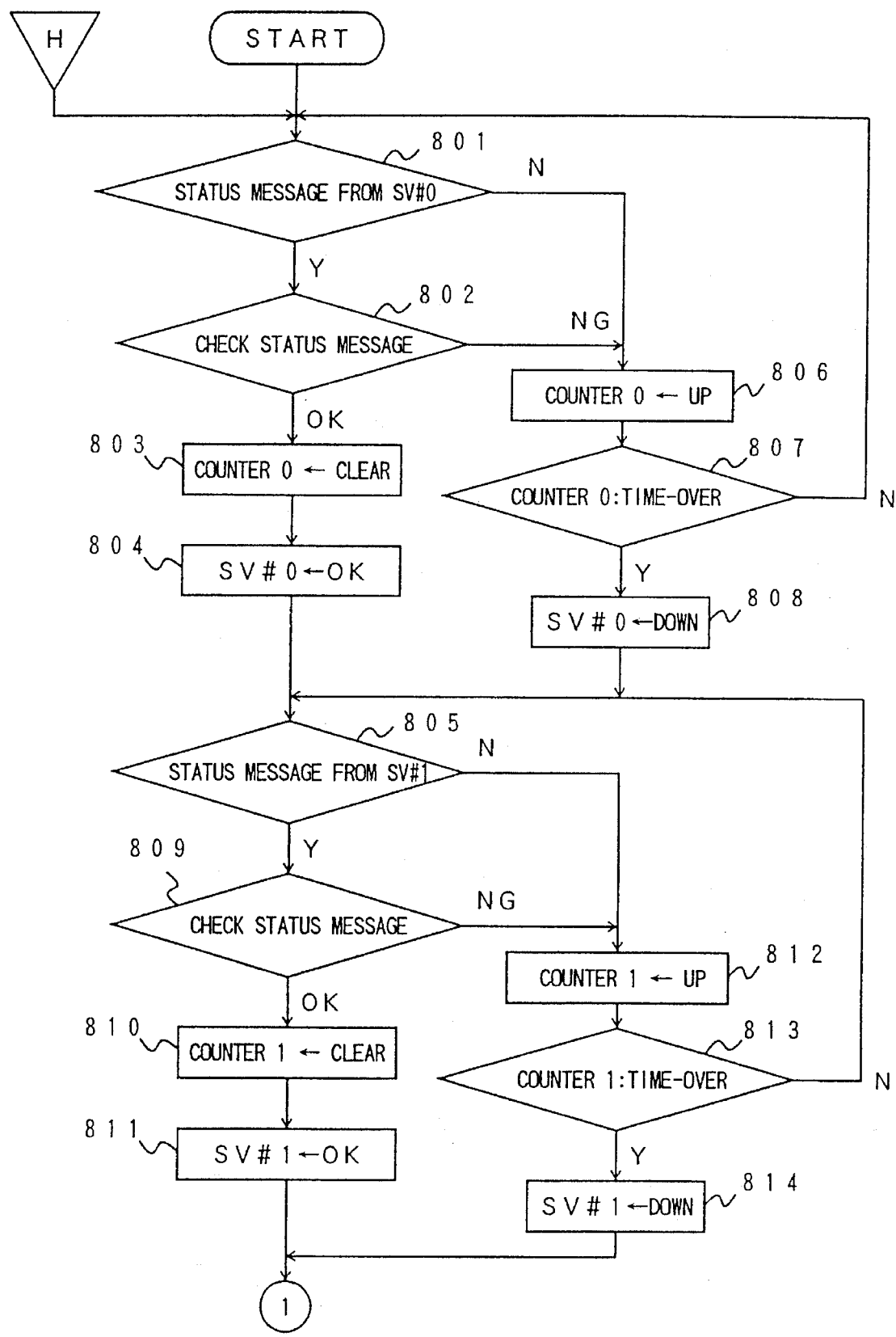
FIGS. 18, 19 and 20 are flow charts illustrating examples of a send and receive processing in the supervisory device controller according to the third embodiment of the present invention.
Figure 19:
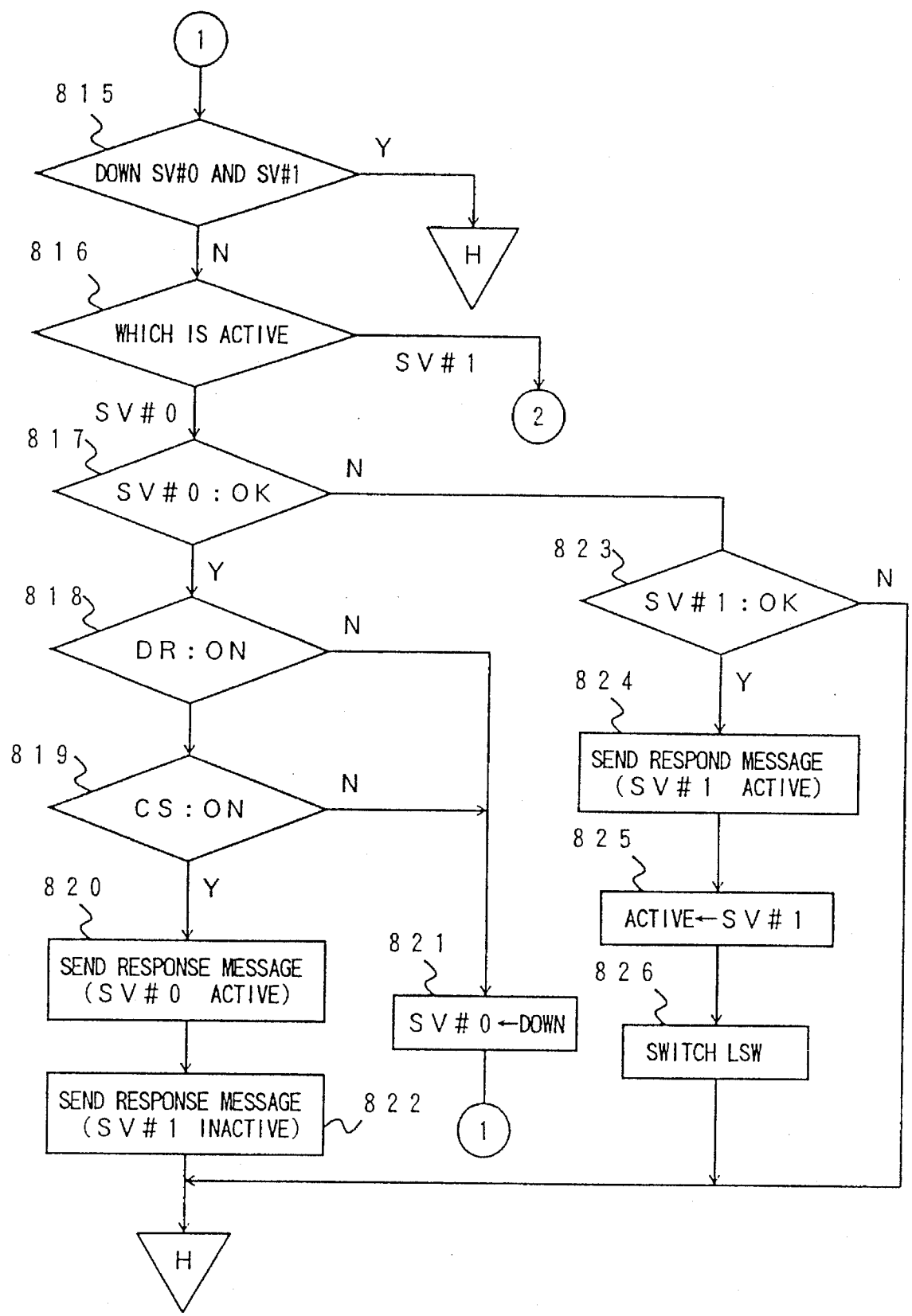
Figure 20:
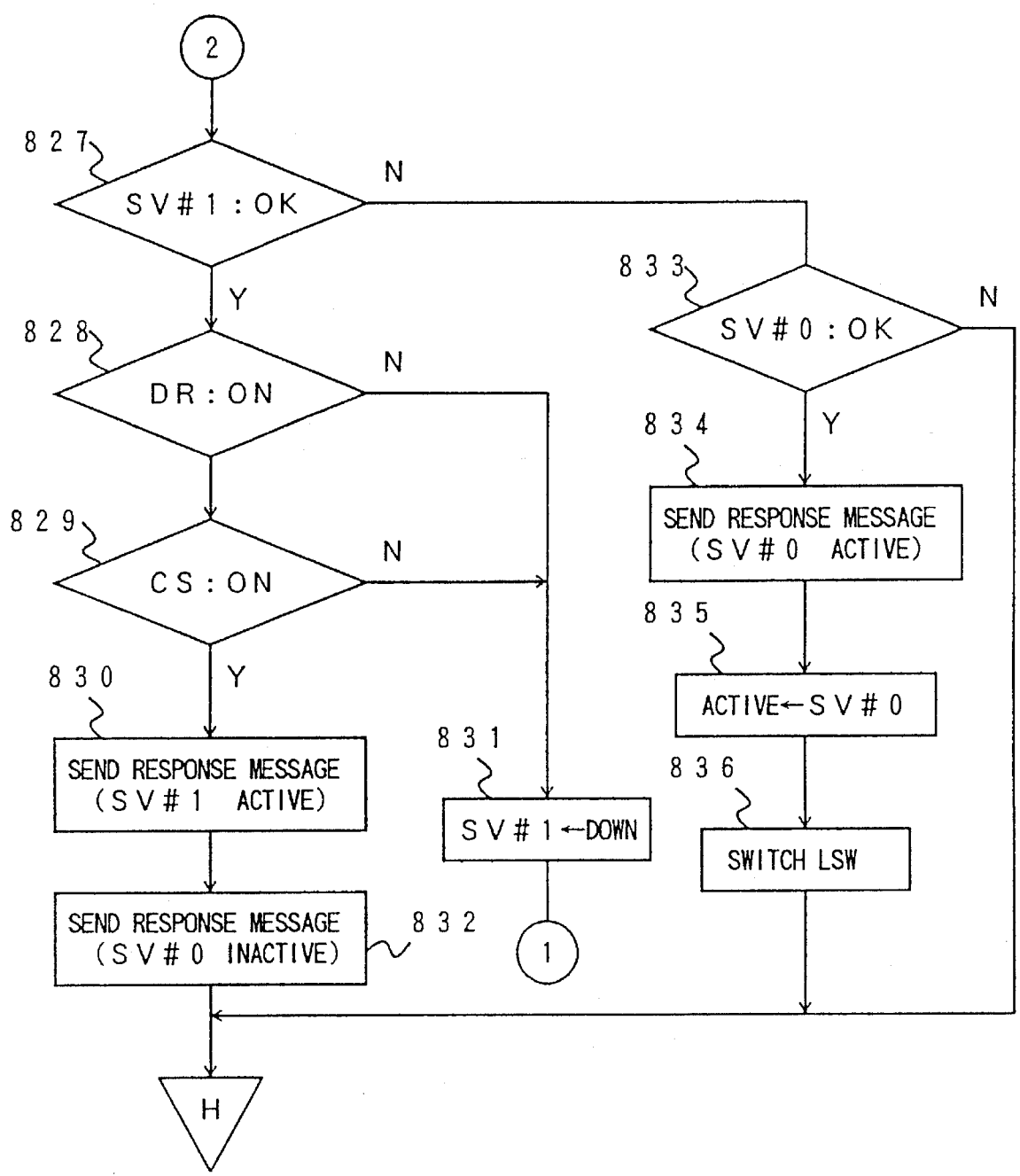

The supervisory device controller SVP operates in accordance with a flow chart shown in FIGS. 18 through 20.

Referring to FIG. 18, in step 801, the supervisory device controller SVP determines whether or not the status message from the first supervisory device SV#0 is received. When the status message from the first supervisory device SV#0 is not received, a first counter (0) is incremented by predetermined value in step 806. It is then determined whether or not the the first counter (0) overflows in step 807. The above process in steps 801, 806 and 807 is repeated either until the status message is received or until the first counter (0) overflows. In this state, when the supervisory device controller SVP receives the status message from the first supervisory device SV#0, the supervisory device controller SVP further determines whether or not the status message is correct in step 802. When it is determined that the status message is not correct in step 802, the process proceeds from the step 802 to step 806. Thus, the increment of the first counter (0) described above is further repeated. When the status message is correct, the supervisory device controller SVP resets the first counter (0) to "0" in step 803. A first flag (flg SV#0) is set to be active in step 804. On the other hand, when the first counter (0) overflows, the first flag (flg SV#0) is set to be inactive in step 808.

The supervisory device controller SVP detects whether or not the second supervisory device SV#1 is normal in accordance with steps 805 and 809 through 814 corresponding to the above steps 801 through 804 and 806 through 808. That is, when the correct status message from the second supervisory device SV#1 is received, a second flag (flg SV#1) is set to be active. On the other hand, the correct status message from the supervisory device SV#1 is not received, the second flag (flg SV#1) is set to be inactive.

The process proceeds to step 815 shown in FIG. 19. Referring to FIG. 19, in step 815, the supervisory device controller SVP determines, with reference to the first and second flags, whether or not both the supervisory devices brake down. When at least either the first or second supervisory device SV#0 or SV#1 is normal, the supervisory device controller SVP further determines whether the first or second supervisory device SV#0 or SV#1 is active in the supervisory operation in step 816. When the first supervisory device SV#0 is active in the supervisory operation, the supervisory device controller SVP determines, based on the first flag (flg SV#0), whether or not the first supervisory device SV#0 is normal in step 817 in step 817. When it is determined that the first supervisory device SV#0 is normal in step 817, the supervisory device controller SVP further determines whether or not the status signals in the signal wires DR(0) and CS(0) are in the on-state in steps 818 and 819. When the status signals in the signal wires DR(0) and CS(0) are in the on-state, the supervisory device controller SVP recognize that the first supervisory device SV#0 is normal. In this case, the supervisory device controller sends the first supervisory device SV#0 a response message indicating that the first supervisory device SV#0 is to be active in the supervisory operation in step 820. A response message indicating the second supervisory device SV#1 is to be inactive in the supervisory operation is sent from the supervisory device controller SVP to the second supervisory device SV#1 in step 822. After this, the process returns to step 801 in the head point of the process. On the other hand, when the status signals in the signal wires DR(0) and CS(0) are in the off-state, the first flag (flg SV#0) is set to be inactive in step 821. After this the process returns to step 815.

When it is determined, in step 815, that both the first and second supervisory devices SV#0 and SV#1 break down, the process returns to step 801 in the head point of the process. On the other hand, it is determined, based on the first flag (flg SV#0), that the first supervisory device SV#0 is not normal in step 817, the process proceeds to step 823.

In step 823, it is determined, based on the second flag (flg SV#1), whether or not the second supervisory device SV#1 is normal. When the second supervisory device is normal, the supervisory device controller SVP sends the second supervisory device SV#1 the response message indicating that the second supervisory device is to be active in the supervisory operation in step 824. An activity/inactivity flag is set, in step 825, so as to indicate that the second supervisory device SV#1 is active in the supervisory operation. The supervisory device controller SVP changes the control signal S3 to be in the on-state. Based on the control signal S3 being in the on-state, the switching device LSW is switched from the first supervisory device SV#0 to the second supervisory device SV#1 in step 826. After this, the process returns to step 801 in the head point of the process.

On the other hand, when it is determined that the second supervisory device SV#1 is active in the supervisory operation in step 816, the process proceeds to step 827 shown in FIG. 20.

Referring to FIG. 20, in step 827, the supervisory device controller SVP determines, based on the second flag (flag SV#1), whether or not the second supervisory device SV#1 is normal. When it is determined that the second supervisory device SV#1 is normal in step 827, the supervisory device controller SVP further determines whether or not the status signals in the signal wires DR(1) and CS(1) are in the on-state in steps 828 and 829. When the status signals in the signal wires DR(1) and CS(1) are in the on-state, the supervisory device controller SVP sends the second supervisory device SV#1 a response message indicating that the second supervisory device SV#1 is to be active in the supervisory operation in step 830. A response message indicating that the first supervisory device SV#0 is to be inactive is sent from the supervisory device controller SVP to the first supervisory device SV#0 in step 832. After this, the process returns to step 801 in the head point of the process. When the status signals in the signal wires DR(1) and CS(1) are in the off-state, the second flag (flg SV#1) is set to be inactive in step 831. After this, the process returns to step 815 shown in FIG. 19.

On the other hand, it is determined, based on the second flag (flg SV#1), that the second supervisory device is not normal in step 827, the process is performed in accordance with steps 833 through 836 corresponding to steps 823 through 826 shown in FIG. 19. In the process in steps 833 through 836, the first supervisory device SV#0 is changed to be active in the supervisory operation.

The present invention is not limited to the aforementioned embodiments, and variations and modifications may be made without departing from the scope of the claimed invention.

What is claimed is:

1. A supervisory system for supervising operations of equipments communicating with each other via communication lines in a network, said supervisory system comprising:

a plurality of signal processing supervisory devices for supervising the operations of equipments in the network; and control means, coupled to said supervisory devices, for receiving therefrom status signals indicative of a proper or non-proper operation status of said plurality of supervisory devices and for generating control signals, for controlling said plurality of supervisory devices so that one of said plurality of supervisory devices performs a supervising operation for said plurality of equipments in the network, wherein said control means comprises:

signal processing determination means for analyzing said status signals and determining whether or not each of said plurality of supervisory devices is operating properly in accordance with said status signals;

instruction data supply means, coupled to the signal processing determination means, for supplying either a first instruction data or a second instruction data to each of said plurality of supervisory devices based on receipt of a signal indicative of a determination result from said signal processing determination means, said first instruction data indicating that a supervisory device is active in the supervisory operation, said second instruction data indicating that a supervisory device is inactive in the supervisory operation; and coupling means for coupling a supervisory device to which said first instruction data is supplied to the equipments so that the supervisory device coupled to the equipments by said coupling means performs the supervisory operation.

2. A supervisory system as claimed in claim 1, wherein each of said plurality of supervisory devices outputs status information indicating whether or not each device of said plurality of supervisory devices is operating normally, and wherein said determination means determines based on the status information whether or not each of said plurality of supervisory device is operating normally.

3. A supervisory system as claimed in claim 1, wherein said coupling means comprises:

control signal output means for outputting a control signal identifying the supervisory device to which the first instruction data is supplied; and switching means, coupled to said plurality of supervisory devices, for switching the supervisory device which is coupled to the equipments from one to another, a switching operation of said switching means being performed based on the control signal output from said control signal output means.

4. A supervisory system as claimed in claim 1, wherein said plurality of supervisory devices includes a first supervisory device, and wherein said coupling means compulsorily couples said first supervisory device to the equipments when said control means malfunctions, said first supervisory device having detecting means for detecting whether or not said control means malfunctions, so that when said detecting means detects that said control means has malfunctioned, said first supervisory device becomes active in the supervisory operation.

5. A supervisory system as claimed in claim 1, wherein each of said supervisory devices is coupled to said control means by signal wires, and wherein said first instruction data, said second instruction data are indicated by electrical signals and said status signals are electrical signals, each of which electrical signals may have an on-state and an off-state, said electrical signals being transmitted through said signal wires.

6. A supervisory system as claimed in claim 5, wherein said first instruction data is indicated by a signal having the on-state, and said second instruction data is indicated by a signal having the off-state.

7. A supervisory system as claimed in claim 1, wherein each of said supervisory devices is coupled to said control means by a data communication line, and wherein said first instruction data, said second instruction data and said status signals are indicated by messages transmitted through said communication lines.

8. A supervisory system as claimed in claim 7, wherein said plurality of supervisory devices includes a first supervisory device, and wherein said coupling means compulsorily couples said first supervisory device to the equipments when said control means malfunctions, said first supervisory device having detecting means for detecting that said control means has malfunctioned when said first supervisory device receives no messages indicating said first and second instruction data in response to said status signals, so that when said detecting means detects that said control means has malfunctioned, said first supervisory device becomes active in the supervisory operation.

9. A supervisory system as claimed in claim 7, further comprising:

a signal line connecting each of said plurality of supervisory devices to said control means, said control means sending a predetermined signal to each of said supervisory devices, said predetermined signal becoming an off-state when said control means malfunctions, wherein said plurality of supervisory devices includes a first supervisory device, and wherein said coupling means compulsorily couples said first supervisory device to the equipments when said control means malfunctions, said first supervisory device having detecting means for detecting that said control means has malfunctioned when receiving said predetermined signal having the off-state, so that when said detecting means detects that said control means has malfunctioned, said first supervisory device becomes active in the supervisory operation.

10. A supervisory system for supervising operations of equipments communicating with each other via communication lines in a network, said supervisory system comprising:

a first supervisory device for supervising operations of a plurality of equipments in the network;

a second supervisory device for supervising operations of said plurality of equipments in the network; and control means, coupled to said first and second supervisory devices, for receiving therefrom status signals indicative of a proper or non-proper operation of said first and second supervisory devices for generating control signals, for controlling said first and second supervisory devices so that one of said supervisory devices performs a supervising operation for said plurality of equipments in the network, wherein said control means comprises:

signal processing determination means, connected to the control means, for determining whether or not each of said first and second supervisory devices is operating properly, in accordance with said status signals;

instruction data supply means, connected to the signal processing determination means, for supplying either a first instruction data or a second instruction data to each of said first and second supervisory devices based on receipt of a signal indicative of a determination result from said signal processing determination means, said first instruction data indicating that a supervisory device is active in the supervisory operation, said second instruction data indicating that a supervisory device is inactive in the supervisory operation; and coupling means for coupling one supervisory device to which said first instruction data is supplied to the equipments so that the supervisory device coupled to the equipments by said coupling means performs the supervisory operation.

11. A supervisory system as claimed in claim 10, wherein said first and second supervisory devices are coupled to said control means by signal wires, and wherein said first instruction data and said second instruction data are indicated by electrical signals and said status signals are electrical signals, each of which may have an on-state and an off-state, said electrical signals being transmitted through said signal wires, said first instruction data being supplied to said first or said second supervisory device by an electrical signal having the on-state, said second instruction being supplied to said first or second supervisory device by an electrical signal having the off-state.

12. A supervisory system as claimed in claim 9, wherein each of said first and second supervisory devices outputs status information indicating whether or not each of said first and second supervisory devices is operating properly, and wherein said determination means determines, based on the status information, whether or not each of said first and second supervisory device is operating properly.

* * * * *